(12) United States Patent
Michel et al.

(10) Patent No.: US 10,641,737 B2
(45) Date of Patent: May 5, 2020

(54) DEVICE AND METHOD FOR THE CONTROL OF ULTRASONIC TRANSDUCERS TO MEASURE METAL PROFILES

(71) Applicant: VALLOUREC TUBES FRANCE, Boulogne Billancourt (FR)

(72) Inventors: Raphael Michel, Valenciennes (FR); Alexandre Noel, Commegnies (FR); Michel Vahe, Curgies (FR)

(73) Assignee: VALLOUREC TUBES FRANCE, Boulogne Billancourt (FR)

( * ) Notice: Subject to any disclaimer, the term of this patent is extended or adjusted under 35 U.S.C. 154(b) by 41 days.

(21) Appl. No.: 14/651,942

(22) PCT Filed: Dec. 18, 2013

(86) PCT No.: PCT/FR2013/531610
§ 371 (c)(1),
(2) Date: Jun. 12, 2015

(87) PCT Pub. No.: WO2014/096700
PCT Pub. Date: Jun. 26, 2014

(65) Prior Publication Data
US 2016/0195499 A1    Jul. 7, 2016

(30) Foreign Application Priority Data
Dec. 21, 2012  (FR) .................................. 12 62683

(51) Int. Cl.
*G01N 29/04* (2006.01)
*G01N 29/26* (2006.01)
*G01N 29/24* (2006.01)

(52) U.S. Cl.
CPC ......... *G01N 29/04* (2013.01); *G01N 29/2437* (2013.01); *G01N 29/262* (2013.01);
(Continued)

(58) Field of Classification Search
CPC ........................... G01N 29/262; G01N 29/343
(Continued)

(56) References Cited

U.S. PATENT DOCUMENTS

| 4,252,026 A | 2/1981 | Robinson |
| 4,694,434 A * | 9/1987 | von Ramm ......... G01S 7/52068 |
| | | 345/419 |

(Continued)

FOREIGN PATENT DOCUMENTS

| FR | 2796153 A1 * | 1/2001 | ........... G01N 29/262 |
| JP | 59063561 A * | 4/1984 | ........... G01N 29/262 |

(Continued)

OTHER PUBLICATIONS

Poidevin et al, Developments in Ultrasonic Phased Array Inspection II Advanced Matrix Phased Arrays Settings for Inspection, 6th International Conference on NDE in Relation to Structural Integrity for Nuclear and Pressurized Components Oct. 2007, Budapest, Hungary (Year: 2007).*

(Continued)

*Primary Examiner* — David L Singer
(74) *Attorney, Agent, or Firm* — Oblon, McClelland, Maier & Neustadt, L.L.P.

(57) ABSTRACT

A device, and corresponding test method, for testing metallurgical products including an ultrasonic sensor including a plurality of elementary transducers which can be operated independently of each other and are distributed in accordance with a two-dimensional pattern is described. A first electronic component is configured to excite each of the elementary transducers in accordance with at least one temporal law corresponding to a burst of ultrasonic waves in a line of sight. A second electronic component is configured to process at least a portion of the signals captured by each of the elementary transducers. Each temporal law is (Continued)

arranged such that the corresponding burst produces a beam of ultrasonic waves which is generally divergent about the line of sight on moving away from the ultrasonic sensor.

24 Claims, 8 Drawing Sheets

(52) U.S. Cl.
CPC ........... *G01N 2291/0234* (2013.01); *G01N 2291/0289* (2013.01); *G01N 2291/106* (2013.01); *G01N 2291/2634* (2013.01)

(58) Field of Classification Search
USPC .................................................. 73/628, 622
See application file for complete search history.

(56) References Cited

U.S. PATENT DOCUMENTS

| | | | | |
|---|---|---|---|---|
| 5,229,933 | A * | 7/1993 | Larson, III | G01S 7/52017 367/104 |
| 5,305,756 | A | 4/1994 | Entrekin et al. | |
| 5,902,244 | A | 5/1999 | Kobayashi et al. | |
| 5,964,708 | A * | 10/1999 | Freeman | G01S 7/52028 600/447 |
| 6,089,096 | A * | 7/2000 | Alexandru | G01N 29/0609 73/625 |
| 6,123,669 | A | 9/2000 | Kanda | |
| 6,277,073 | B1 * | 8/2001 | Bolorforosh | G01S 7/52047 600/437 |
| 2003/0236461 | A1 * | 12/2003 | Poland | G01N 29/0609 600/443 |
| 2004/0016299 | A1 * | 1/2004 | Glascock | G01N 29/221 73/638 |
| 2004/0267127 | A1 * | 12/2004 | Abend | A61B 8/06 600/450 |
| 2005/0081636 | A1 * | 4/2005 | Barshinger | G01N 29/262 73/606 |
| 2005/0156364 | A1 | 7/2005 | Bisiaux et al. | |
| 2006/0283250 | A1 * | 12/2006 | Fair | G01N 29/262 73/593 |
| 2007/0163348 | A1 * | 7/2007 | Heckel | G01N 29/069 73/584 |
| 2007/0239013 | A1 * | 10/2007 | Alexandru | G10K 11/346 600/443 |
| 2007/0242567 | A1 * | 10/2007 | Daft | A61B 8/12 367/140 |
| 2007/0276237 | A1 * | 11/2007 | Li | G01S 7/52095 600/437 |
| 2009/0234230 | A1 * | 9/2009 | Bercoff | G01S 7/52049 600/447 |
| 2010/0106431 | A1 * | 4/2010 | Baba | G01N 29/04 702/39 |
| 2010/0242613 | A1 * | 9/2010 | Simard | G01N 29/262 73/641 |
| 2010/0251821 | A1 * | 10/2010 | Mizota | G01N 29/262 73/602 |
| 2011/0102429 | A1 * | 5/2011 | Matsumoto | G01N 29/069 345/419 |
| 2012/0036934 | A1 * | 2/2012 | Kroning | G01N 29/043 73/628 |
| 2012/0055255 | A1 * | 3/2012 | Metala | G01M 13/00 73/660 |

FOREIGN PATENT DOCUMENTS

| | | |
|---|---|---|
| JP | 2011-227060 A | 11/2011 |
| WO | 03/050527 A1 | 6/2003 |

OTHER PUBLICATIONS

Ginzel, Beam Width Analysis, NDT.net—Sep. 2001, vol. 6 No. 9 (Year: 2001).*
Tomov, THESIS: Compact beamforming in medical ultrasound scanners, 2004 (Year: 2004).*
Poole, How to Create Parabolic Curves Using Straight Lines, 2012, WonderHowTo (Year: 2012).*
Matematicas Visuales, Polynomial functions and derivative (2): Quadratic function, 2012 (Year: 2012).*
How Phased Arrays Work, 2008, https://www.applusrtd.com.au/files/brochure/39_Howphasedarraysworks.pdf (Year: 2008).*
International Search Report dated Mar. 20, 2014 in PCT/FR2013/053161 filed Dec. 18, 2013.
International Search Report dated Mar. 20, 2014 in PCT/FR2013/053161 (with English translation of categories of cited documents).

* cited by examiner

Fig.7A - Delay Table for a Multi-Element Matrix Electroacoustic Sensor 70

| $B_{1,1}$ | $B_{1,2}$ | $B_{1,3}$ | $B_{1,4}$ | $B_{1,5}$ | $B_{1,6}$ | $B_{1,7}$ | $B_{1,8}$ |
|---|---|---|---|---|---|---|---|
| $B_{2,1}$ | $B_{2,2}$ | $B_{2,3}$ | $B_{2,4}$ | $B_{2,5}$ | $B_{2,6}$ | $B_{2,7}$ | $B_{2,8}$ |
| $B_{3,1}$ | $B_{3,2}$ | $B_{3,3}$ | $B_{3,4}$ | $B_{3,5}$ | $B_{3,6}$ | $B_{3,7}$ | $B_{3,8}$ |
| $B_{4,1}$ | $B_{4,2}$ | $B_{4,3}$ | $B_{4,4}$ | $B_{4,5}$ | $B_{4,6}$ | $B_{4,7}$ | $B_{4,8}$ |
| $B_{5,1}$ | $B_{5,2}$ | $B_{5,3}$ | $B_{5,4}$ | $B_{5,5}$ | $B_{5,6}$ | $B_{5,7}$ | $B_{5,8}$ |
| $B_{6,1}$ | $B_{6,2}$ | $B_{6,3}$ | $B_{6,4}$ | $B_{6,5}$ | $B_{6,6}$ | $B_{6,7}$ | $B_{6,8}$ |
| $B_{7,1}$ | $B_{7,2}$ | $B_{7,3}$ | $B_{7,4}$ | $B_{7,5}$ | $B_{7,6}$ | $B_{7,7}$ | $B_{7,8}$ |
| $B_{8,1}$ | $B_{8,2}$ | $B_{8,3}$ | $B_{8,4}$ | $B_{8,5}$ | $B_{8,6}$ | $B_{8,7}$ | $B_{8,8}$ |

Fig.7B - Delay Table for a Multi-Element Matrix Electroacoustic Sensor 71

| $B_{1,1}$ | $B_{1,2}$ | $B_{1,3}$ | $B_{1,4}$ | $B_{1,4}$ | $B_{1,3}$ | $B_{1,2}$ | $B_{1,1}$ |
|---|---|---|---|---|---|---|---|
| $B_{2,1}$ | $B_{2,2}$ | $B_{2,3}$ | $B_{2,4}$ | $B_{2,4}$ | $B_{2,3}$ | $B_{2,2}$ | $B_{2,1}$ |
| $B_{3,1}$ | $B_{3,2}$ | $B_{3,3}$ | $B_{3,4}$ | $B_{3,4}$ | $B_{3,3}$ | $B_{3,2}$ | $B_{3,1}$ |
| $B_{4,1}$ | $B_{4,2}$ | $B_{4,3}$ | $B_{4,4}$ | $B_{4,4}$ | $B_{4,3}$ | $B_{4,2}$ | $B_{4,1}$ |
| $B_{5,1}$ | $B_{5,2}$ | $B_{5,3}$ | $B_{5,4}$ | $B_{5,4}$ | $B_{5,3}$ | $B_{5,2}$ | $B_{5,1}$ |
| $B_{6,1}$ | $B_{6,2}$ | $B_{6,3}$ | $B_{6,4}$ | $B_{6,4}$ | $B_{6,3}$ | $B_{6,2}$ | $B_{6,1}$ |
| $B_{7,1}$ | $B_{7,2}$ | $B_{7,3}$ | $B_{7,4}$ | $B_{7,4}$ | $B_{7,3}$ | $B_{7,2}$ | $B_{7,1}$ |
| $B_{8,1}$ | $B_{8,2}$ | $B_{8,3}$ | $B_{8,4}$ | $B_{8,4}$ | $B_{8,3}$ | $B_{8,2}$ | $B_{8,1}$ |

Fig.16 - Delay Table for a Multi-Element Matrix Electroacoustic Sensor 72

| $A_{1,1}$ | $A_{1,2}$ | $A_{1,3}$ | $A_{1,4}$ | $A_{1,5}$ | $A_{1,6}$ | $A_{1,7}$ | $A_{1,8}$ |
|---|---|---|---|---|---|---|---|
| $A_{2,1}$ | $A_{2,2}$ | $A_{2,3}$ | $A_{2,4}$ | $A_{2,5}$ | $A_{2,6}$ | $A_{2,7}$ | $B_{2,8}$ |
| $A_{3,1}$ | $A_{3,2}$ | $A_{3,3}$ | $A_{3,4}$ | $A_{3,5}$ | $A_{3,6}$ | $B_{3,7}$ | $B_{3,8}$ |
| $A_{4,1}$ | $A_{4,2}$ | $A_{4,3}$ | $A_{4,4}$ | $A_{4,5}$ | $B_{4,6}$ | $B_{4,7}$ | $B_{4,8}$ |
| $A_{5,1}$ | $A_{5,2}$ | $A_{5,3}$ | $A_{5,4}$ | $B_{5,5}$ | $B_{5,6}$ | $B_{5,7}$ | $B_{5,8}$ |
| $A_{6,1}$ | $A_{6,2}$ | $A_{6,3}$ | $B_{6,4}$ | $B_{6,5}$ | $B_{6,6}$ | $B_{6,7}$ | $B_{6,8}$ |
| $A_{7,1}$ | $A_{7,2}$ | $B_{7,3}$ | $B_{7,4}$ | $B_{7,5}$ | $B_{7,6}$ | $B_{7,7}$ | $B_{7,8}$ |
| $A_{8,1}$ | $B_{8,2}$ | $B_{8,3}$ | $B_{8,4}$ | $B_{8,5}$ | $B_{8,6}$ | $B_{8,7}$ | $B_{8,8}$ |

Fig.15 - Delay Table for a Multi-Element Matrix Electroacoustic Sensor 73

| $A_{1,1}$ | $A_{1,2}$ | $A_{1,3}$ | $A_{1,4}$ | $A_{1,5}$ | $A_{1,6}$ | $A_{1,7}$ | $A_{1,8}$ |
|---|---|---|---|---|---|---|---|
| $A_{2,1}$ | $A_{2,2}$ | $A_{2,3}$ | $A_{2,4}$ | $A_{2,5}$ | $A_{2,6}$ | $A_{2,7}$ | $A_{2,8}$ |
| $A_{3,1}$ | $A_{3,2}$ | $A_{3,3}$ | $A_{3,4}$ | $A_{3,5}$ | $A_{3,6}$ | $A_{3,7}$ | $A_{3,8}$ |
| $A_{4,1}$ | $A_{4,2}$ | $A_{4,3}$ | $A_{4,4}$ | $A_{4,5}$ | $A_{4,6}$ | $A_{4,7}$ | $A_{4,8}$ |
| $A_{5,1}$ | $A_{5,2}$ | $A_{5,3}$ | $A_{5,4}$ | $A_{5,5}$ | $A_{5,6}$ | $A_{5,7}$ | $A_{5,8}$ |
| $A_{6,1}$ | $A_{6,2}$ | $A_{6,3}$ | $A_{6,4}$ | $A_{6,5}$ | $A_{6,6}$ | $A_{6,7}$ | $A_{6,8}$ |
| $A_{7,1}$ | $A_{7,2}$ | $A_{7,3}$ | $A_{7,4}$ | $A_{7,5}$ | $A_{7,6}$ | $A_{7,7}$ | $A_{7,8}$ |
| $A_{8,1}$ | $A_{8,2}$ | $A_{8,3}$ | $A_{8,4}$ | $A_{8,5}$ | $A_{8,6}$ | $A_{8,7}$ | $A_{8,8}$ |

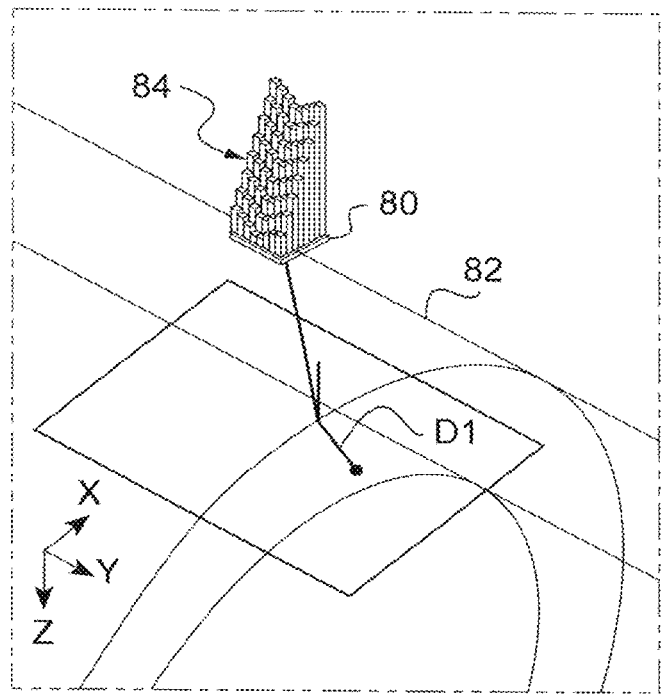
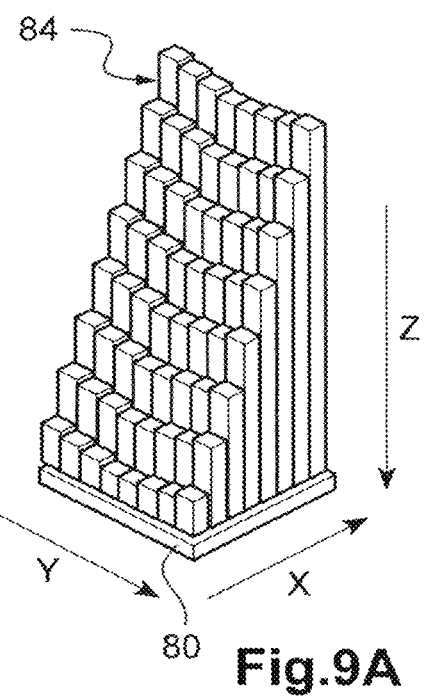
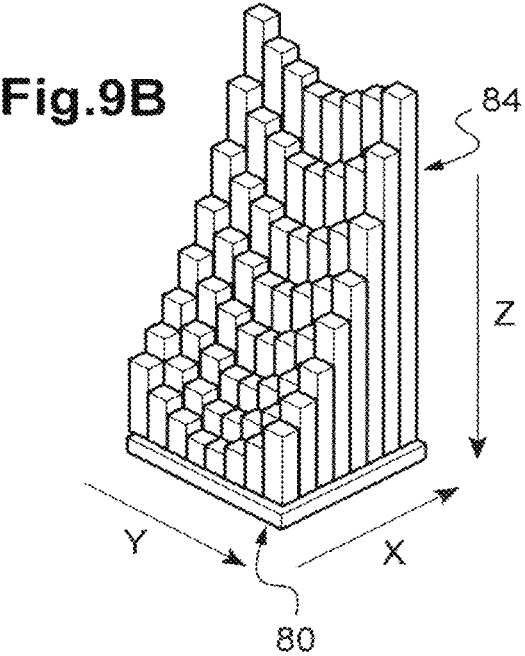
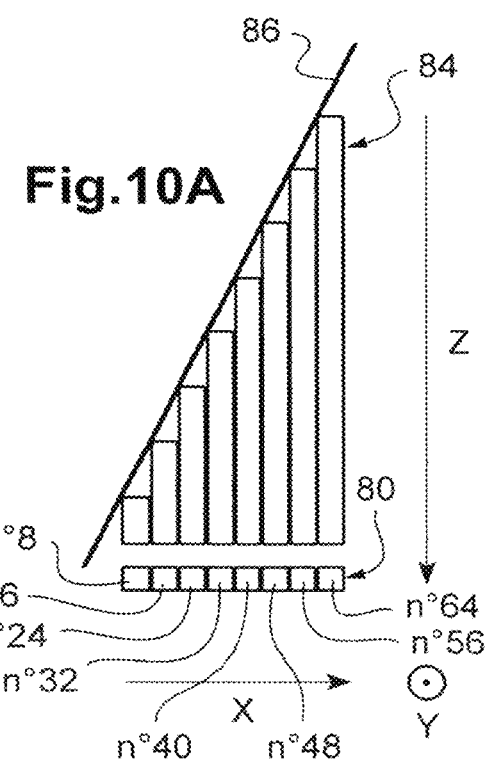

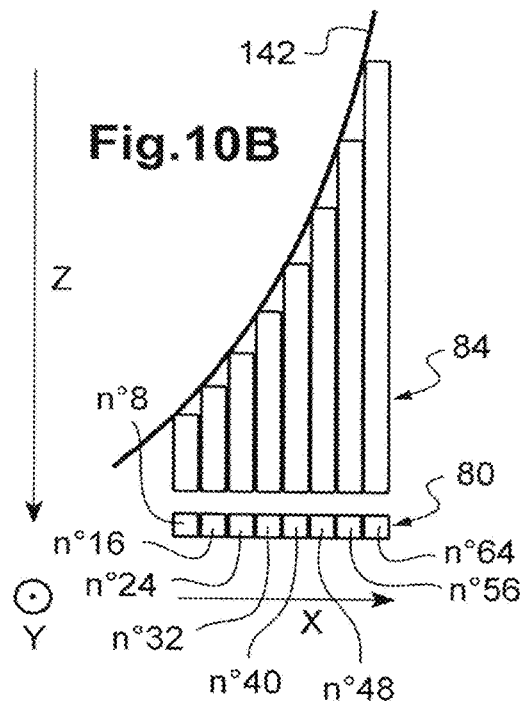
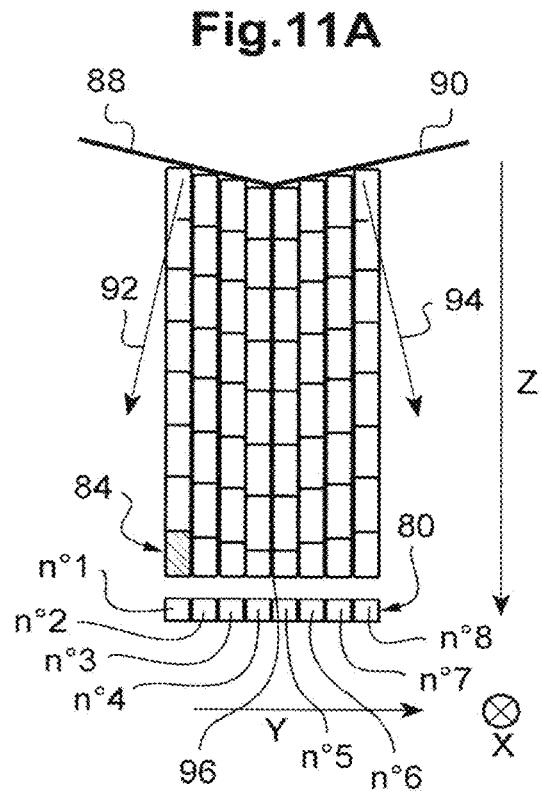
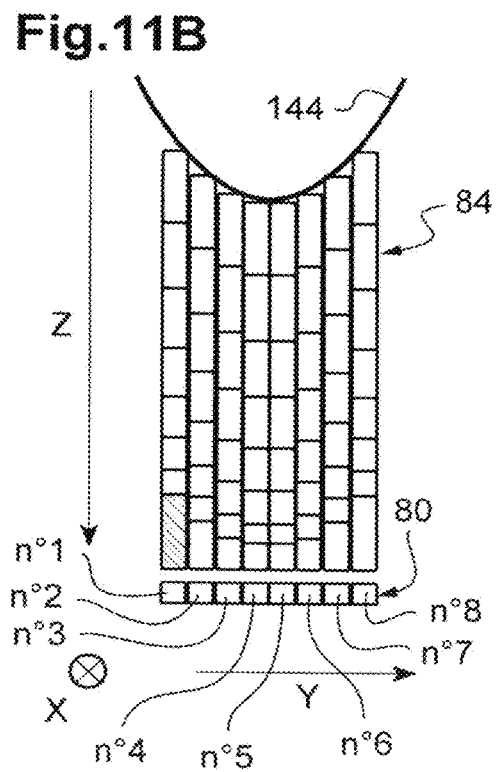
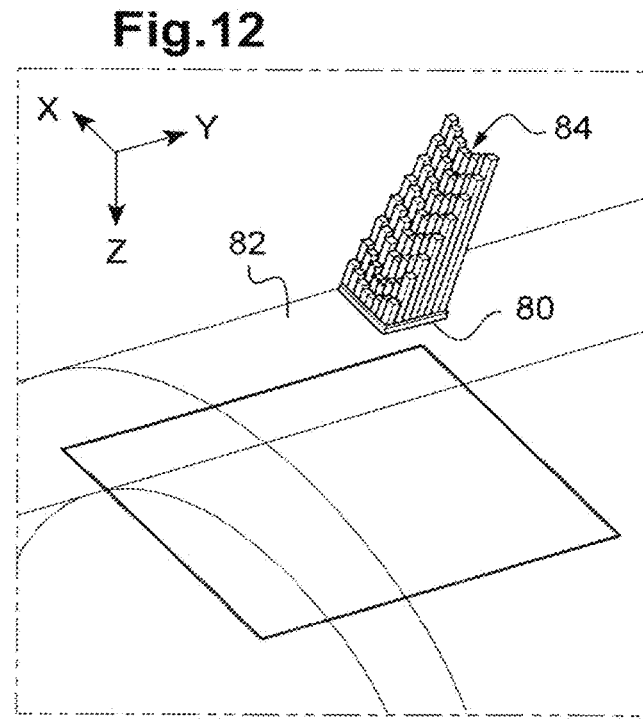

DEVICE AND METHOD FOR THE CONTROL OF ULTRASONIC TRANSDUCERS TO MEASURE METAL PROFILES

The invention relates to the field of non-destructive testing of metallurgical products, in particular with long profiles, typically in the range from a few metres to several tens of metres.

In order to understand the invention better, it will be described in the context of generally tubular products, in particular tubes, as examples of metallurgical products. However, the invention is intended to be of wider application.

Great length tubes are widely used. Examples of fields of application which may be cited are electricity production where boiler tubes are used, oil and gas production, where tubes are used for drilling, extraction and transport (line pipes), or indeed mechanical construction, which could be in civil engineering, or indeed in the automobile and aviation sectors.

As with the majority of metallurgical products, the tubes are susceptible of possessing defects linked to their manufacture, such as inclusions of material in steel, or the absence of material, for example. In general, any heterogeneity in the steel matrix is viewed as a defect which is susceptible of impairing the mechanical strength of the tube in service.

For this reason, metal tubes are inspected immediately after their manufacture, not only to detect any defects therein, but also, if appropriate, to determine information for use in assessing the hazard profile of these defects, in particular the size, depth, position, nature or indeed the orientation.

When manufacturing a batch of tubes, it is desirable to inspect as many as possible as reliably as possible. Certain protagonists in the field, such as the Applicant, inspect each tube produced individually.

Testing of a tube represents a manufacturing step with the same status as more conventional shaping steps.

Because they have an influence on the production rate, test methods which are carried out have to be economical and rapid, and still remain reliable. Practically automatic test methods are also being investigated.

In particular, test techniques using ultrasonic waves are used. The ultrasonic waves are emitted and the resulting echoes are studied, looking for those which cannot be attributed to the geometry of the tube. Inclusions or absences of material constitute variations in the wave propagation medium, and for this reason generate echoes when they are struck by the ultrasonic waves.

The intensity of the echo produced by a defect depends on the angle at which the wave strikes it. For any direction of propagation of the ultrasonic wave in the tube, defects orientated correspondingly, i.e. perpendicular to the direction of propagation, are principally detected, but with a certain tolerance of the order of one or two degrees.

In practice, defects are not purely longitudinal or transverse, but reflect an echo which is of a greater or lesser extent in one or the other of these directions. As an example, a defect is qualified as longitudinal when it generates an echo with an intensity above a defined threshold in response to a burst with a corresponding orientation. This threshold is fixed by calibration using notches with a normalized position (depth and orientation) and dimensions. The orientation of a defect may be equated to its largest reflective surface.

The duration of the test principally depends on the time necessary for the ultrasonic waves to pass through the tube, there and back, and to a certain extent on that for processing the captured returned signals.

In order to comply with demands linked to production rates and safety, it has become standard practice to limit the number of ultrasonic bursts and only to look for defects orientated in certain inclinations.

Conventionally, the aim is to detect defects with the broadest inclination, generally defects orientated parallel to the tube generatrix.

Recent developments in the art are targeted towards test methods which can also detect defects with different orientations while limiting the number of bursts in order to keep the test rate acceptable.

U.S. Pat. No. 5,473,943 discloses an ultrasonic wave test device comprising nine ultrasonic sensors or transducers distributed around a tube to be tested. A device of this type can be used to detect defects orientated in nine different directions with respect to each other. The number of directions which can be tested remains limited by the number of sensors. Further, that device can only be used to inspect a narrow zone of the tube, which means that the tube has to be advanced very slowly with respect to the sensors, or that the number of sensors has to be multiplied. A low rate of advance is incompatible with production demands, while increasing the number of sensors poses problems with costs and adjustment.

Some recent developments use ultrasonic sensors known as "phased array" sensors, also known as "multi-element linear transducers". These sensors comprise a plurality of electroacoustic transducers in the form of piezoelectric elements distributed over an active face of the sensor in a principal direction. As an example, these transducers may be disposed in a manner which is aligned with respect to each other and form what is sometimes known as a "transducer bar". Sensors with a distribution of this type are said to be "one-dimensional". The transducers are sequentially excited one after the other in a manner so as to combine the ultrasonic waves produced to form a deflected beam of waves, which may be focused (focal point in front of the sensor), which means that a tube can be inspected as to the existence of defects orientated in a corresponding direction.

An ultrasonic wave test device comprising a one-dimensional phased array type sensor is also known, in which the elementary transducers are distributed around the tube to be tested. A device of this type can be used to detect defects with almost all inclinations, but only in a reduced section of the tube. Because only a zone with a very small longitudinal extent can be inspected at one time, it must be operated at a low tube advance speed. The result is that the duration of the inspection is too long for industrial application to be envisageable. Furthermore, the device in question necessitates a different sensor per diameter of the tube to be inspected.

WO 2003/050527 discloses non-destructive test equipment for metallurgical products in which a one-dimensional phased array type sensor is used. Each transducer element is excited once, then a processing circuit analyses the overall response of the tube to this single emission, which is known in the art as a burst. Starting from a burst in the transverse direction of the tube, it is capable of determining the presence not only of defects disposed perpendicular to this direction, but also defects with an inclination with respect to this perpendicular direction which is within plus and minus 10°.

In practice, three sensors are used: two sensors dedicated to the detection of defects which are orientated longitudinally or have an inclination with respect to this longitudinal direction in the range plus 20° to minus 20°, and a supplemental sensor for detecting defects orientated transversely to the tube and/or for measuring the thickness of that tube.

The equipment in question is broadly satisfactory.

It can be used to test a tube as to the existence of defects orientated in a limited number of orientations. In order to test the tube as to the existence of defects with any orientation, it is necessary to multiply the number of sensors or to modify the orientation of the sensors with respect to the tube a number of times, each time in order to target a different direction.

The Applicant has sought to improve the existing position.

The proposed device for testing metallurgical products is of the type comprising an ultrasonic sensor comprising a plurality of elementary transducers which can be operated independently of each other and which are distributed in a two-dimensional pattern, a first electronic component which is capable of exciting each of the elementary transducers in accordance with at least one temporal law corresponding to a burst of ultrasonic waves in a line of sight, and a second electronic component which is capable of processing at least a portion of the signals captured by each of the elementary transducers. Each temporal law is arranged such that the corresponding burst produces a beam of ultrasonic waves which is generally divergent about the line of sight with increasing distance from the ultrasonic sensor.

The proposed method for testing metallurgical products comprises providing an ultrasonic sensor comprising a plurality of elementary transducers which can be operated independently of each other and are distributed in accordance with a two-dimensional pattern, exciting each of the elementary transducers in order to produce a burst of ultrasonic waves corresponding to a beam which is generally divergent about a line of sight with increasing distance from the ultrasonic sensor, and processing at least a portion of the signals captured by each of the elementary transducers in response to the ultrasonic burst.

In contrast to conventional methods and devices which seek to deflect and to focus a beam of ultrasonic waves in the inspection line of sight, the proposed device emits a beam of ultrasonic waves which diverges about the line of sight.

For a burst sighting a particular line, a more extensive zone of the tube is covered by the ultrasonic waves resulting from this burst.

This more extensive "insonification" zone can be used to detect defects which have a greater inclination with respect to the line of sight than in conventional devices.

The proposed device can be used to detect defects at any inclination with the aid of a single sensor excited a limited number of times, while retaining a good testing rate.

In particular, with the aid of a single sensor and a limited number of bursts, it is possible to detect transverse defects, also termed "circumferential", i.e. defects extending perpendicularly to the generatrix of the tube, longitudinal defects which extend along this generatrix, and defects making any angle with the generatrix of the tube to be tested.

The gain in productivity and reliability is substantial.

Other characteristics and advantages of the invention will become apparent from an examination of the following detailed description and the accompanying drawings in which:

FIG. 1 diagrammatically shows a non-destructive testing device for a tube, in front view;

Figure 13A:
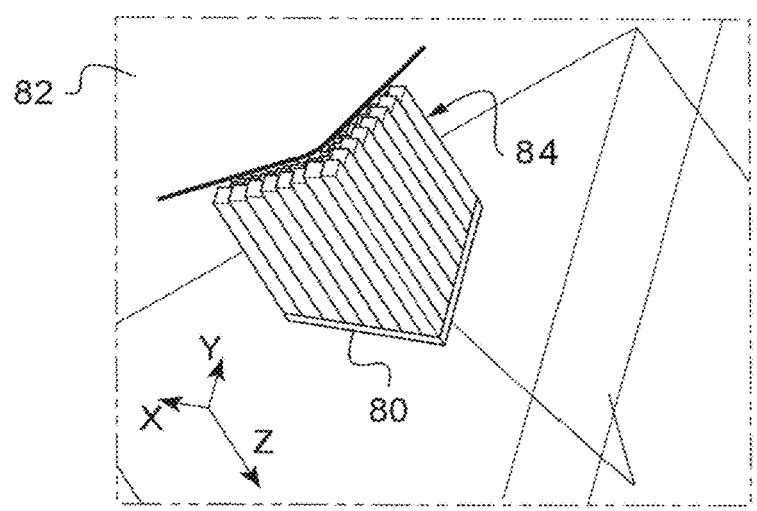
Figure 14:
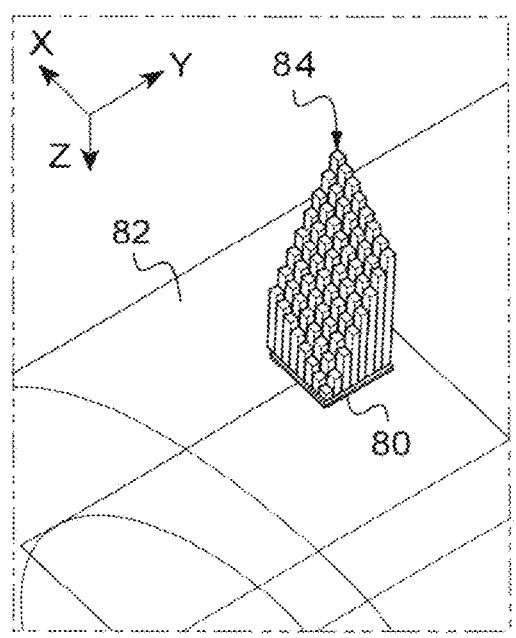
Figure 17:
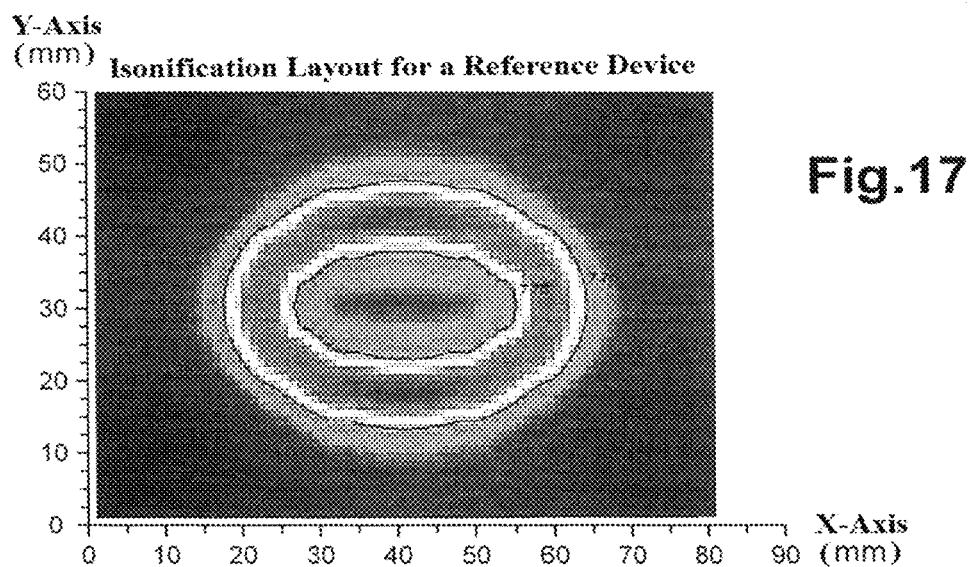
Figure 18A:
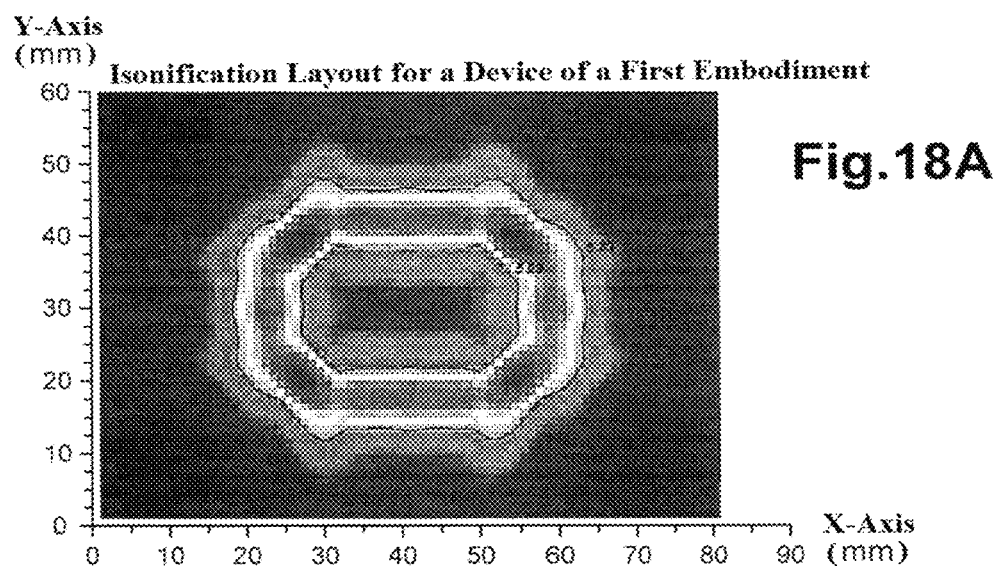
Figure 18B:
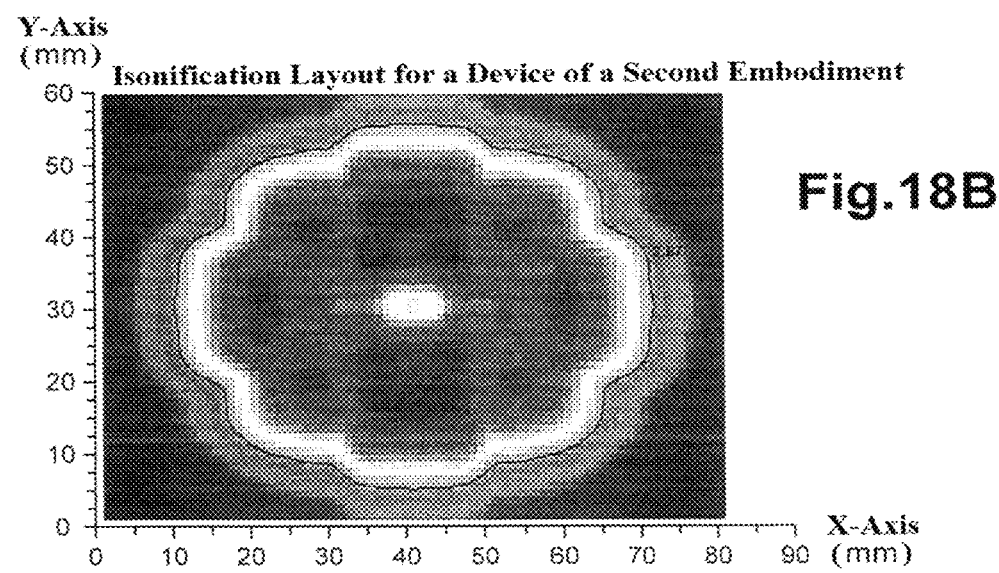

FIGS. 7A and 7B respectively represent a first and a second delay table for a multi-element matrix electroacoustic sensor;

FIG. 8 represents a perspective view of an array of elementary transducers in the working position with respect to a tube to be tested, and a bar diagram showing the delay values applied to these transducers for a longitudinal burst in accordance with a first variation of a first embodiment of the invention;

FIG. 9A represents the table and the diagram of FIG. 8 in isolation, shown in perspective;

FIG. 10A represents the bar diagram of FIG. 9A, in side view;

FIG. 11A represents the bar diagram of FIG. 9A in front view;

FIG. 12 is analogous to FIG. 8, for a transverse burst;

FIG. 13A is analogous to FIG. 8 for an oblique burst;

FIG. 14 shows the table and diagram of FIG. 13A in perspective, at a different viewing angle;

FIGS. 9B, 10B, 11B and 13B are respectively analogous to FIGS. 9A, 10A, 11A and 13A for a second variation of the first embodiment;

FIGS. 15 and 16 are analogous to FIGS. 7A and 7B for different excitation conditions;

FIGS. 17, 18A and 18B show "insonification" layouts for a reference device, a device in accordance with the first embodiment of the invention, and a device in accordance with a second embodiment of the invention respectively;

Annex A.1 indicates, in the form of tables, delay values corresponding to the first variation of the first embodiment of the invention;

Annex A.2 indicates, in the form of tables, delay values corresponding to the second variation of the first embodiment of the invention;

Annex A.3 indicates, in the form of tables, the transposition laws for the delay values for different burst directions;

Annex A.4 indicates, in the form of tables, delay values corresponding to a second embodiment of the invention;

Annex A.5 is an addressing matrix for the elementary transducers of an electroacoustic sensor.

The drawings and the annexes comprise elements of a certain nature. Thus, they could not only serve as the description of the invention, but also serve to define it, as appropriate.

Figure 2:
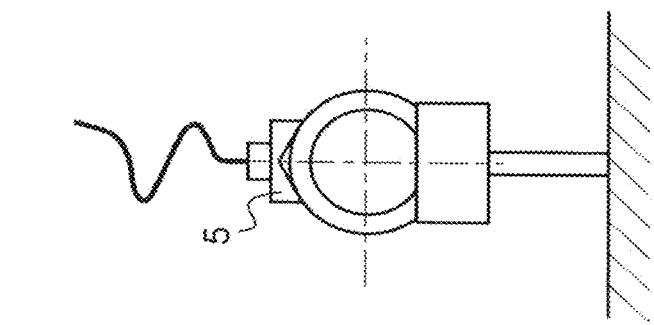
FIG. 2 represents the device of FIG. 1, in side view.
Figure 1:
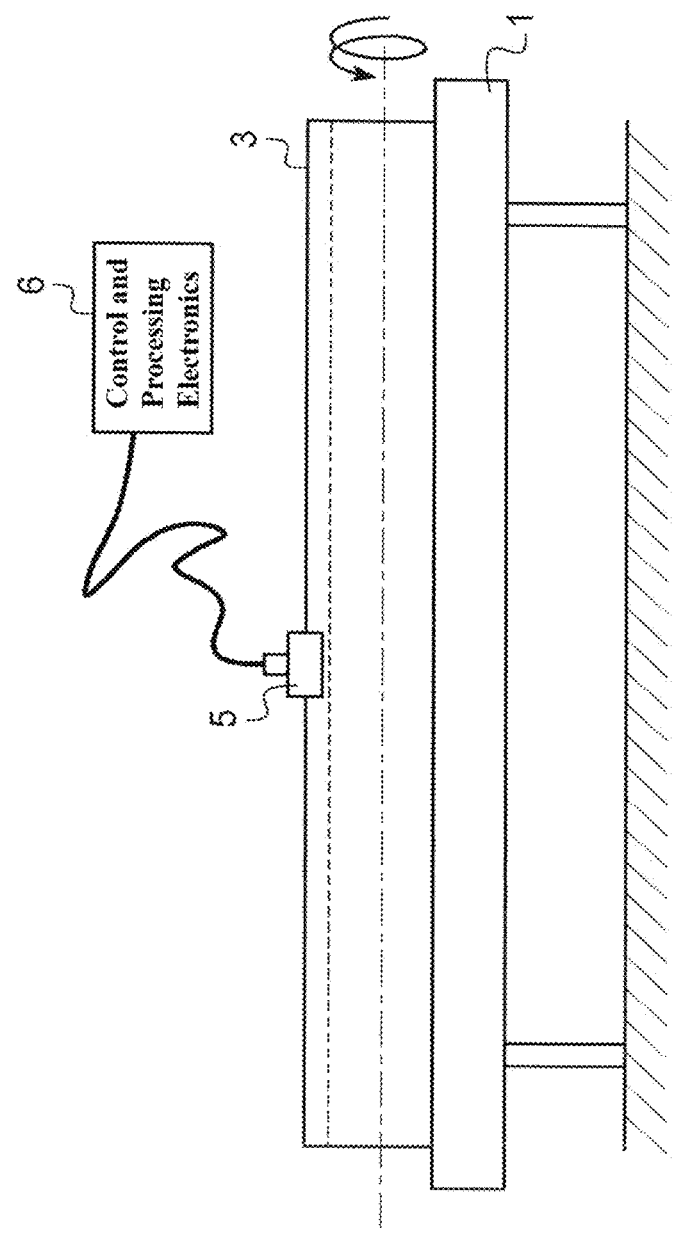

Reference will now be made to FIGS. 1 and 2.

Ultrasonic wave test equipment comprises a bench 1 supporting a metal tube 3 to be tested and an ultrasonic sensor 5 applied against the peripheral surface of the tube 3, and connected to control and processing electronics 6. The ultrasonic sensor 5 is sometimes known in the art as a transducer.

For the test, the sensor 5 and the tube 3 are displaced helically relative to each other. Here, the tube 3 is displaced with respect to the bench 1 in accordance with a helical movement about an axis corresponding to its longitudinal axis, while the sensor 5 is held in position with respect to the bench 1. The bench 1 may be provided with rotary rollers inclined with respect to the longitudinal axis of the tube 3.

In a variation, the tube 3 may be moved in rotation alone with respect to the bench 1, while the sensor 5 slides in the longitudinal direction of the bench 1. The sensor may be mounted on a carriage which is movable with respect to the bench 1. In accordance with yet another variation, the sensor 5 may turn about the tube 3 while the latter is translated with respect to the bench 1.

The relative helical motion between the sensor 5 and the tube 3 means that the whole of the tube 3 can be tested using one sensor 5 with reduced dimensions compared with the circumference of the tube 3. Alternatively, a larger number of sensors could be provided, disposed in a ring around the tube 3, and a burst sequence could be carried out which ensured coverage when the tube 3 slides with respect to the sensor 5.

A coupling medium or coupler, for example in the form of a gel, may be interposed between the sensor 5 and the peripheral surface of the tube 3. In a variation, the apparatus may comprise a box filled with water or any other liquid coupling medium in which the tube 3 and the sensor 5 are immersed.

Figure 3:
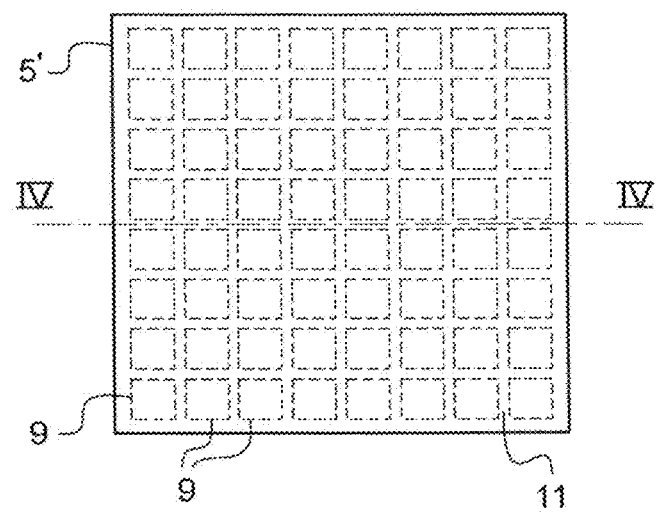
FIG. 3 represents an electroacoustic sensor for use in the device of FIG. 1, in front view.
Figure 4:
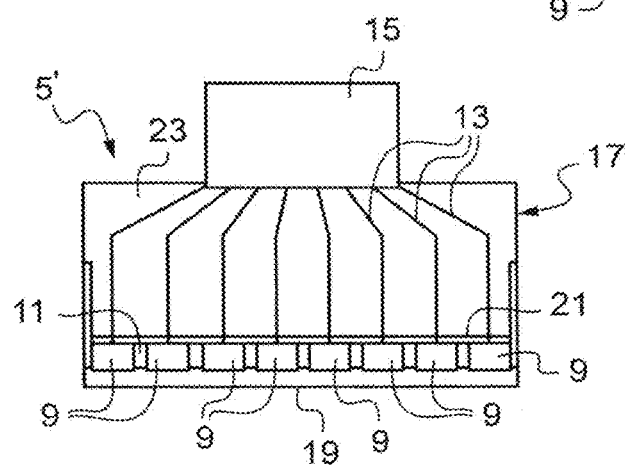
FIG. 4 represents the sensor of FIG. 3 in sectional view along a line IV-IV.

Reference will now be made to FIGS. 3 and 4.

They show a sensor 5', of the "mosaic" type, which may be used as a sensor 5 in the apparatus of FIGS. 1 and 2. Mosaic sensors are sometimes known as "multi-element transducers" in the art.

The sensor 5' comprises a plurality of bars 9 formed from a piezoelectric material, in this case distributed in a regular manner as an array. As shown, the sensor 5' corresponds to that which is generally known in the art as a "multi-element array transducer".

The bars 9 are embedded in a matrix 11 formed from an electrically inert polymer material. The bars 9 are electrically and acoustically independent of each other. Each bar 9 may be individually excited in order to generate ultrasonic pulses without these pulses reaching adjacent bars 9. Each bar 9 thus forms an elementary transducer which can function independently of the other bars 9.

The sensor 5' has an emitting surface which is not constituted by a homogeneous, bulk piezoelectric material, and so it is different from conventional sensors. In contrast, the emitting surface of the sensor 5' is produced from a composite material comprising a polymer matrix and a plurality of elements formed from piezoelectric material.

The sensor 5' here comprises sixty-four bars 9 distributed in a regular manner in accordance with a square pattern with eight bars 9 to a side. Each bar 9 here has a square section the side of which is smaller than 1 millimetre and larger than 0.1 millimetre. The separation is of the order of a tenth of a millimetre on facing sides of adjacent bars 9.

The square pattern is only one example of a two-dimensional pattern. A multi-element sensor is said to have a two-dimensional pattern when its elementary transducers are distributed in accordance with two directions which are distinct from each other over an active surface of the sensor, that which acts for emitting and receiving ultrasonic waves.

More generally, the invention may be carried out with any two-dimensional pattern.

Each bar 9 is attached to its own electrical cable 13 and which connects it to control and processing electronics. The electrical cables 13 are collected together in a sheath represented by the block with reference 15 in FIG. 4.

The sensor 5' comprises a casing 17 to which the sheath 15 is attached and which houses the bars 9. The casing 17 is closed by an adaptation layer 19 in contact with the active surface of each of the bars 9. The bars 9 are in contact with a metal plate 21 via a face opposite to their face in contact with the adaptation layer 19 in order to earth it. The space which is still free in the casing 17 is filled with a packing 23.

Figure 5:
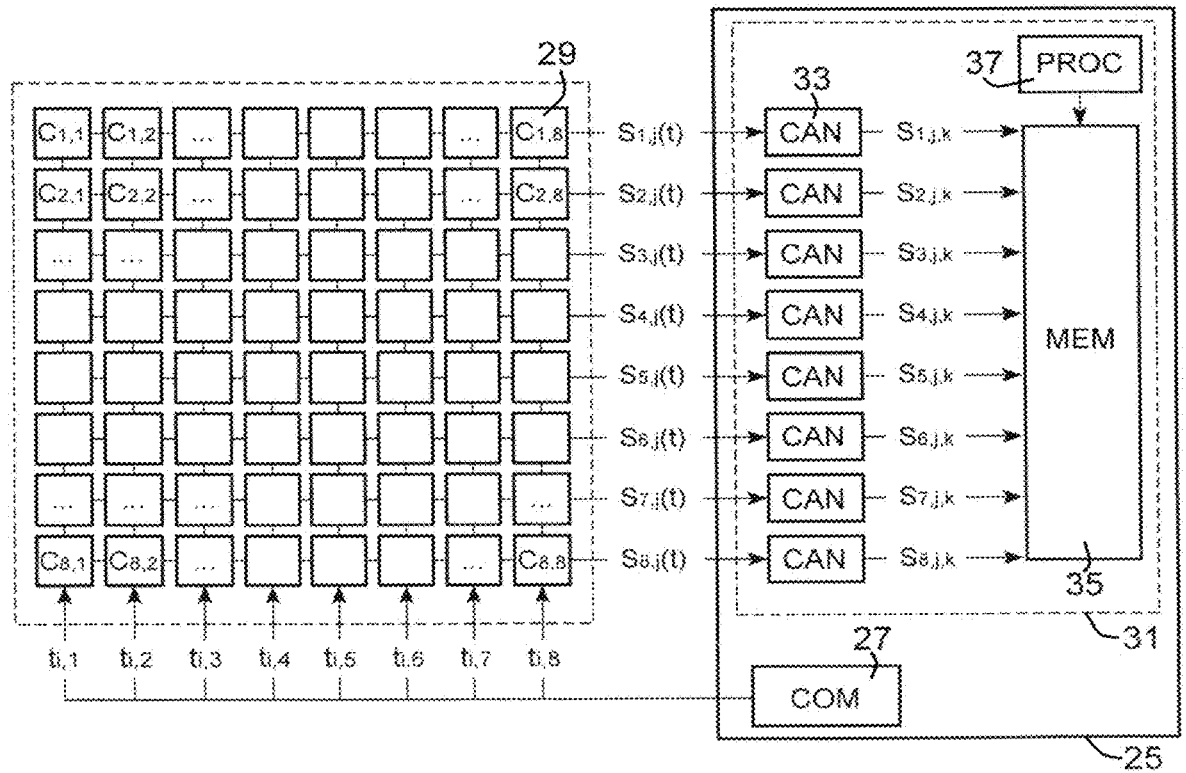
FIG. 5 represents a block diagram of control and processing electronic components for the electroacoustic sensor of FIG. 3.

FIG. 5 shows an example of operating electronics 25 for an ultrasonic sensor which may be of the type of sensor 5' described above.

The operating electronics 25 comprise an excitation circuit 27 individually connected to each of the elementary transducers 29 of the sensor in question. In this case, the elementary transducers 29 are distributed in accordance with a pattern corresponding to an array with a square shape with eight transducers per side. In FIG. 5, an elementary transducer $Ci,j$ is marked by its position in the table (line i, column j).

For the purposes of simplification of the drawing, the excitation circuit 27 of FIG. 5 is in each case connected to a single elementary transducer $Ci,j$ of each column only. In practice, the excitation circuit 27 is connected to each elementary transducer $Ci,j$ individually.

The operating electronics 25 also comprise an acquisition circuit 31 which is capable of recording and processing signals obtained from waves captured by the elementary transducers 29. Each elementary transducer $Ci,j$ is individually connected to a respective analogue-to-digital converter 33 which samples the output signal $Si,j(t)$ of the transducer $Ci,j$ in question and supplies a memory 35 with the digital representation $Si,j,k$ obtained, at least over a predefined time period. The content of the memory 35 may be processed using a processing unit 37, for example a microprocessor.

For the purposes of simplification of the drawing, an analogue-to-digital converter 33 of FIG. 5 is connected in each case to a single piezoelectric element $Ci,j$ of each line only. In practice, each analogue-to-digital converter 33 is individually connected to all of the elementary transducers $Ci,j$ of its line.

The elementary transducers 29 are excited individually and sequentially. A "burst" is the term used for the process which consists of causing each elementary transducer $Ci,j$ to emit a series of pulses. A burst corresponds to implementing a temporal excitation law which determines, for each elementary transducer $Ci,j$, a respectively delay $ti,j$ with respect to a temporal reference which is common to the set of elementary transducers $Ci,j$. Once excited, the elementary transducers jointly produce a beam of ultrasonic waves.

An excitation law is computed so as to sight a particular direction, which means that the elementary transducers 29 together produce a beam of ultrasonic waves which propagate in this particular direction or burst direction.

In accordance with a first embodiment of the invention, the direction of the burst is inclined with respect to the normal to the principal plane of the active surface of the sensor when this is flat, or to the central zone of this surface when it is curved. The beam of ultrasonic waves may be viewed as a deflected beam. This beam diverges about the line of sight.

In accordance with a second embodiment of the invention, the burst direction substantially corresponds to the normal to the principal plane of the active surface of the sensor when this is flat, or to the central zone of this surface when it is curved. The beam of ultrasonic waves is divergent. In particular, this beam is defocussed.

Figure 6A:
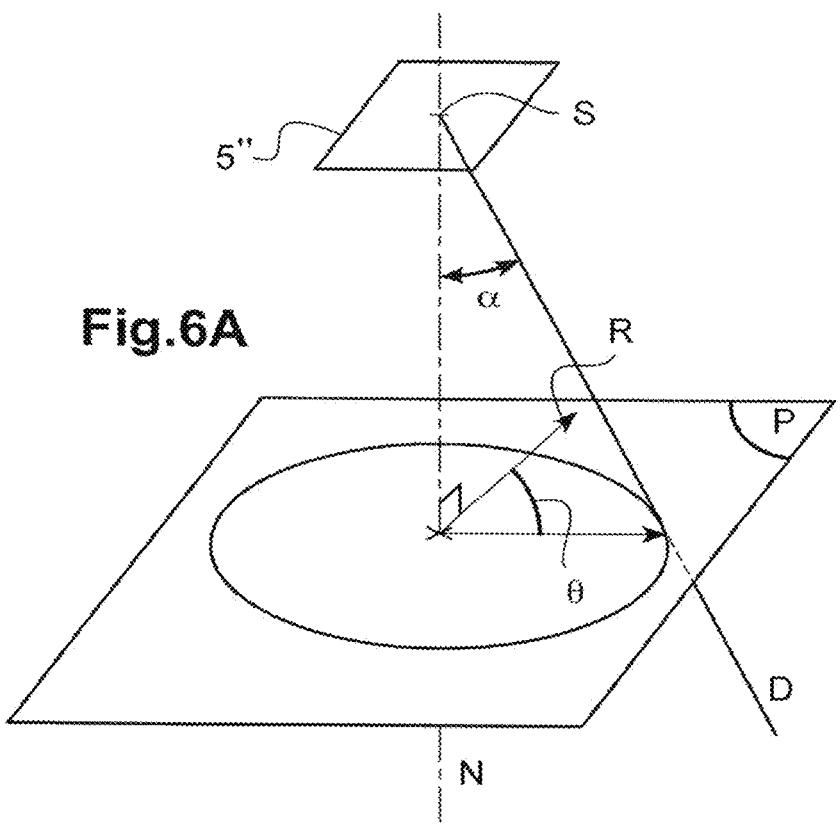
FIG. 6A represents a diagram illustrating a burst direction for an ultrasonic beam in space.

Reference will now be made to FIG. 6A.

This shows a multi-element sensor 5" which is generally flat, square in shape, with a geometric centre with reference S.

The direction of propagation D of a beam of ultrasonic waves, also termed the primary direction here, may be defined by means of the following parameters:

a first angle α, or "deflection angle", which this direction of propagation makes with the normal N to the principal plane of the sensor 5" (when the multi-element sensor is not flat, then the normal to the central zone of this sensor is what is considered);

a second angle θ, termed the "angle of obliquity" or abbreviated to "obliquity", which the direction of propagation D makes with a reference direction R, this latter being linked to the sensor 5" and to its geometry, in a plane P perpendicular to the normal N to the sensor 5".

The sensor 5" is preferably positioned with respect to a tube to be inspected in a manner such that the principal plane of the sensor 5" is directed in a direction tangential to the tube or, in other words, that the normal N to the principal plane of this sensor 5" at the geometric centre S coincides with a radius of the tube in question.

A burst in a direction of propagation D can be used to detect defects orientated in a corresponding manner in the tube, i.e. perpendicular to the direction corresponding to the obliquity of the direction of propagation D, or making a certain angle with this perpendicular direction.

In accordance with the invention, the beam of ultrasonic waves used for inspection diverges about its direction of propagation D.

Figure 6B:
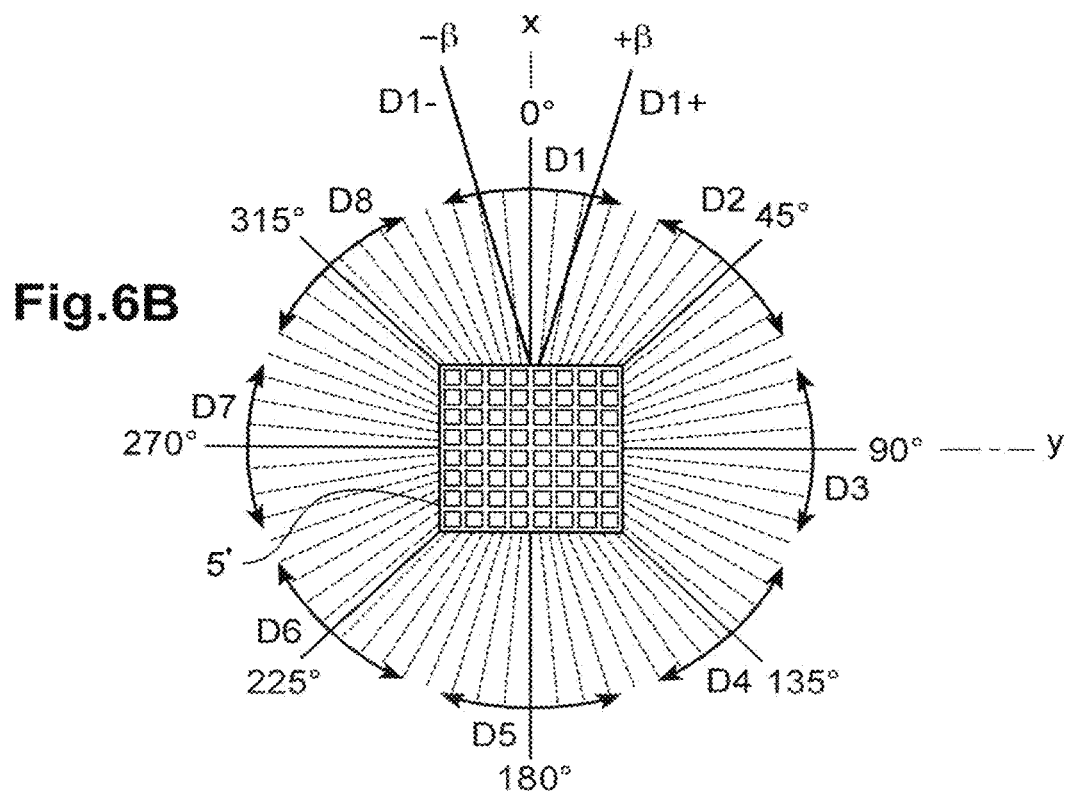
FIG. 6B represents a diagram illustrating an array of elementary transducers.

Reference will now be made to FIG. 6B.

It highlights an array 5' of elementary transducers distributed in accordance with a square pattern. Without limiting the invention, the array 5' here comprises 8×8 elementary transducers. The pattern has a first axis of symmetry x and a second axis of symmetry y, respectively corresponding to the midpoint perpendiculars of the sides of the pattern.

Preferably, the ultrasonic sensor is positioned with respect to the tube to be tested such that the first axis of symmetry x or the second axis of symmetry y of the pattern corresponds to the longitudinal direction of the tube. By convention, it will be assumed that in FIG. 6B, the sensor is disposed such that the first axis of symmetry x corresponds to the transverse direction of the tube to be tested. The first axis of symmetry x acts as a reference direction for the measurement of the angle of obliquity θ. In this relative position of the ultrasonic sensor and the tube, the second axis of symmetry y of the array 5' corresponds to the longitudinal direction of the tube.

In an advantageous development of the first embodiment of the invention, an ultrasonic burst is envisaged in each of several burst directions which differ from each other by the value of their respective obliquity $\theta_i (i=1, 2, \ldots n)$ measured with respect to the direction of the first axis of symmetry x of the sensor 5'. The obliquities $\theta_i$ are determined in a manner such that an angular sector of 2 π radians(360°) is covered in a regular manner. Thus, the tube can be tested as to the existence of defects irrespective of the orientation of these defects in the tube. In a still more advantageous development, eight successive ultrasonic bursts are carried out which differ from each other in the value of their respective obliquity $\theta_i$ (i=1, 2, ... 8).

The following table summarizes the characteristics of the various bursts.

| Rank of burst | Burst direction | Obliquity (with respect to the x direction) |
|---|---|---|
| 1 | D1 | θ1 = 0° |
| 2 | D2 | θ2 = 45° |
| 3 | D3 | θ3 = 90° |
| 4 | D4 | θ4 = 135° |
| 5 | D5 | θ5 = 180° |
| 6 | D6 | θ6 = 225° |
| 7 | D7 | θ7 = 276° |
| 8 | D8 | θ8 = 315° |

In this table, the rank of the burst is only indicative; what is important is that at the end of the eight bursts, the whole of the angular sector of 2 iπ radians has been covered. The order in which the bursts are carried out is of little importance. This is primarily due to the fact that in accordance with the invention, it is possible to modify the direction of propagation of an ultrasonic beam without modifying the orientation of the ultrasonic sensor with respect to the tube.

A respective temporal excitation law corresponds to each burst which causes the resulting beam of ultrasonic waves to propagate in a particular line of sight Di, i: =1, . . . 8 or burst direction.

In accordance with a first variation of the first embodiment of the invention, each temporal excitation law comprises at least two sub-laws each defining the delay values to be applied to the transducers of a respective sub-set of the array 5' such that the elementary transducers of the corresponding sub-set jointly produce a primary beam of ultrasonic waves in a respective direction of propagation, the respective directions of propagation of the primary beams diverging with respect to each other and with respect to the burst direction Di of the resulting beam on moving away from the ultrasonic sensor.

In a first form of this first variation, the primary beams are not focused, i.e. they have no focusing, neither direct nor inverse (inverse focusing is also sometimes known as "defocusing"). As an example, the primary beams may have a distant focus compared with the distance separating the sensor from the tube to be tested. As an example, each primary beam has a focal point which is more than one metre from the sensor, while this latter is at a distance from the tube which is in the range 30 to 40 millimetres.

In a second form of this first variation, the primary beams are each defocussed, i.e. they have an inverse focusing. The focal point is behind the ultrasonic sensor with respect to the path of the ultrasonic waves.

The respective directions of emission of the primary beams form a respective angle either side of the direction of propagation.

The sub-laws are arranged such that the corresponding primary beams encounter a target surface of the tube to be tested corresponding to the line of sight at two respective penetration zones of this surface which are adjacent to each other.

This first variation of the first embodiment corresponds to emitting a beam of ultrasonic waves which is deflected and divergent; this beam results from the emission of multi-directional beams, in particular bi-directional. The sub-beams are not focused or have a distant focus.

Each sub-law is determined such that the corresponding sub-set of elementary transducers produces a beam termed the primary beam the direction of propagation of which forms an angle of inclination β with respect to the line of sight Di, i:=1, . . . 8) on one side or the other of this line.

The direction of propagation of each primary beam is such that it has an obliquity which is deduced from the obliquity $\theta_i$, i:=1, . . . 8 of the direction of propagation Di, i:=1, . . . 8 of the resulting beam by addition or respectively subtraction of the value of the angle of inclination β. Each primary beam is deflected and diverges with respect to the line of sight Di.

In a non-focused beam, the ultrasonic waves produced by the various elementary transducers principally propagate parallel to each other. In order to obtain a non-focused primary beam, delay values which follow a linear law are applied to a corresponding sub-set of elementary transducers. The beam of ultrasonic waves resulting from the primary beams diverges about the burst direction Di, i:=1 . . . 8 on moving away from the ultrasonic sensor.

In accordance with a second variation of the first embodiment of the invention, each temporal excitation law defines delay values to be applied to at least a portion of the transducers of the array 5' in a manner such that these elementary transducers jointly produce a primary beam of ultrasonic waves which extend in an emission direction, or primary direction, corresponding to the burst direction Di and diverge about this burst direction on moving away from the ultrasonic sensor.

This second variation of the first embodiment corresponds to the emission of a divergent beam of ultrasonic waves which is deflected with respect to the normal N to the principal plane of the sensor.

A divergent beam has an angle of divergence. The value of this angle may be determined experimentally, optionally with the aid of simulations which can be used to visualize the resulting beam. In practice, divergence angle values are sought which can be used to cover the largest possible angular sector while preserving good detection quality. This limits the number of bursts necessary to inspect a tube as to the existence of a defect of any inclination. As an example, coverage of an angular sector of 40° is desirable. As an example, a value for the angle of divergence of 22.5° may be used.

Firstly, it is important to construct a temporal excitation law which can be used to produce a burst in a first direction D1, in the case of the first variation.

The elementary transducers of the array 5' located to one side of the first axis of symmetry x (left hand side in FIG. 6B) form a first sub-set and will jointly generate a beam of non-focused ultrasonic waves which are inclined at an angle −β with respect to the obliquity of the direction D1. The elementary transducers located on the other side of the first axis of symmetry x (right hand side in FIG. 6B) form a second sub-set and will generate a non-focused beam of ultrasonic waves inclined at an angle +β with respect to this obliquity. The two primary beams join up in the direction D1 into a resultant beam, i.e. they superimpose or merge in the direction D1 to ensure the transmission of energy in the direction D1, such that the resultant beam is energetically homogeneous between the directions (D1−β) and (D1+β) at the surface of the tube. The result is a broad focal spot at the surface of the tube, or insonification zone, which can be used to seek out defects which have a fairly steep inclination with respect to the direction corresponding to the obliquity of the burst direction.

Reference will now be made to FIG. 7A.

Table 70 generically shows the delay values to be applied to each elementary transducer of the array 5'. The value $B_{i,j}$ of the delay to be applied to the elementary transducer $C_{i,j}$ of array 5' is found in line i, column j of the table 70.

Reference will now be made to FIG. 7B.

Table 71 is analogous to table 70. Table 71 generically shows the delay values to be applied to produce a burst in the first direction D1.

The delays applied to the transducers of one of the sub-sets are deduced from those to be applied to the transducers of the other of the sub-sets by a symmetry the axis of which corresponds to the first direction of symmetry x of array 5'. The value $B_{i,j}$ of the delay to be applied to the transducer $C_{i,j}$ is equal to the value $B_{i,n-j+1}$ of the delay to be applied to the transducer $C_{i,n-j+1}$, the integer n corresponding to the number of elementary transducers in a line of the array 5' (in this case, n=8). As an example, the value $B_{2,3}$ of the delay to be applied to the elementary transducer $C_{2,3}$ is equal to the value $B_{2,6}$ to be applied to the elementary transducer $C_{2,6}$.

In other words, the same temporal excitation sub-law is applied to each of the two sub-sets of elementary transducers of the array 5'.

For a sub-set of elementary transducers, the set of delay values $B_{i,j}$ such that i:=1 to 8 and j:=1 to 4 may be computed by applying the laws for computing the propagation and interference of ultrasonic waves which are known to the skilled person in the field. This computation may in particular be carried out manually, using a spreadsheet or using specific software, for example of the type known as "CIVA", distributed by the firm EXTENDE.

The table of annex A.3 shows the transposition laws which, starting from the delay values obtained for a burst in the first direction D1, can be used to deduce delay values for the burst in the fifth direction D5 because of the symmetry of the sensor. The delay values to be applied to the elementary transducers $C_{i,j}$ for a burst in the fifth direction D5 are deduced from the values computed for the burst in D1 by the transformation indicated in annex A.3.

The delay values to be applied to the elementary transducers $C_{i,j}$ for a burst in the third direction D3 are computed in an analogous manner to that which has been carried out for the first direction D1.

The elementary transducers of array 5' located to one side of the second axis of symmetry y (at the top in FIG. 6B) form a first sub-set and will jointly generate a non-focused beam of ultrasonic waves which is inclined at an angle −β with respect to the obliquity of the direction D3. The elementary transducers located on the other side of the second axis of symmetry y (at the bottom in FIG. 6B) form a second sub-set and will generate a non-focused beam of ultrasonic waves which is inclined at an angle +β with respect to this obliquity. The two primary beams join up in the direction D3 into a resultant beam in order to ensure the transmission of energy in the direction D3, such that the resulting beam is energetically homogeneous between the directions (D3−β) and (D3+β) at the surface of the tube. This results in a broad focal spot on the surface of the tube, or insonification zone, which can be used to investigate defects which are fairly steeply inclined with respect to the direction corresponding to the obliquity of the burst direction.

Annex A.3 shows that delay values for the seventh direction D7 (in the first axis of symmetry x) can be deduced from the delay values in the direction D3 by symmetry.

Consider a burst in the direction D2.

The elementary transducers of the array 5' located to one side of a diagonal of the pattern corresponding to the direction D2 (at the top in FIG. 6B) form a first sub-set and will jointly generate a beam of non-focused ultrasonic waves inclined at an angle −β with respect to the obliquity of the direction D2. The elementary transducers located to the other side of this diagonal (at the bottom in FIG. 6B) form a second sub-set and will generate a non-focused beam of ultrasonic waves inclined at an angle +β with respect to this obliquity. The two primary beams join up in the direction D2 in a manner such that the resulting beam is energetically homogeneous between the directions (D2−β) and (D2+β) at the surface of the tube. This results in a broad focal spot at the surface of the tube, or insonification zone, which can be used to investigate defects which are fairly steeply inclined with respect to the direction corresponding to the obliquity of the burst direction.

Annex A.3 shows that it is possible to deduce delay values for the fourth direction D4 (in the second axis of symmetry y; as also shown in annex A.1.4) from the delay values for a burst in the direction D2 by symmetry; then for the sixth direction D6, starting from delay values corresponding to the direction D4, by symmetry about the first axis x. Delay values for a burst in the eighth direction D8 are deduced from delay values corresponding to the direction D2, by symmetry about the first axis x, or delay values corresponding to the direction D6, by symmetry about the second axis y.

Annex A.5 shows an addressing matrix for elements distributed in accordance with a square pattern, which addressing matrix may be used for the elementary transducers of array 5', for example.

As the address, the numeral 1 or a minimal address value is attributed to an elementary transducer disposed at a corner of the square pattern. Element No 1 is in column C1 of line L1 of the table in annex A.5. The numeral 64, or a maximal address value, is assigned an address for the elementary transducer which is diametrically opposed to transducer No 1. This element is found in column C8 of line L8 in the table of annex A.5. From the element with the minimal address to the element with the maximal address, the elements are mutually ordered by increasing address values and disposed, in this order, in lines then in columns of the same line. In other words, transducers in the same line of the pattern have address values which follow on from each other. In the table of annex A.5, the address values are successive whole numbers in the range 1 to 64.

FIG. 8 shows a portion 80 of a multi-element sensor in a working position with respect to a portion 82 of a tube to be tested. The portion 80 corresponds to an array of elementary transducers which form a square pattern, for example analogous to the array 5' of FIG. 6B. The longitudinal direction of the tube has the reference Y. The direction normal to the principal plane of the portion 80 corresponds to a radial direction of the tube, denoted Z. The direction normal to the plane defined by the directions Y and Z is denoted X. The portion 80 is disposed with respect to the tube portion 82 in a manner such that the axes of symmetry y and x of the pattern, corresponding to the midpoint perpendiculars of the sides of the pattern, are respectively aligned in the directions Y and X.

By way of example, the elementary transducers of the portion 80 are organized in accordance with the addressing matrix described above with respect to annex A.5. The portion 80 is disposed with respect to the tube portion 82 such that the direction X of the tube corresponds to a first axis of symmetry x separating elements No 4 and No 5, while the direction Y corresponds to a second axis of symmetry separating elements No 25 and No 33. Elements No 1 to No 8 are disposed in the direction Y in the sense of this direction indicated by the arrow in FIG. 8. In other words, the first axis of symmetry x of the portion 80 is disposed in the transverse direction X of the tube portion 82, while the second axis of symmetry y is disposed in the longitudinal direction Y of the tube.

Annex A.1.1 shows, in the form of a table, an example of delay values to be applied to the elementary transducers of the portion 80 in order to produce a burst in the transverse direction X of the tube portion 82, i.e. the direction D1 of FIG. 6B. In the table of annex A.1.1, the elementary transducers are arranged in accordance with the addressing matrix defined by annex A.5. The delay value to be applied to the element No i is found in the table of annex A.1.1 at the same position (line, column) as the address i in the table of annex A.5. As an example, the delay to be applied to element No 28 which is at the intersection of column C4 and line L4 of the table of annex A.5, is 369 nanoseconds, which value can be found at the intersection of column C4 and line L4 of the table of annex A.1.1.

FIGS. 9A, 10A and 11A show the delay values of annex A.1.1 in the form of a two-dimensional rod diagram 84, the base of which coincides with the portion 80. Each bar or rod of the diagram represents the delay of the respective elementary transducer which coincides with its base. The height of the rod, which is represented in the form of an extension in the Z direction, is proportional to the value of the delay to be applied to the elementary transducer in question.

FIG. 10A shows the diagram 84 viewed from the right, i.e. projected in a plane with directions X, Z and a normal direction Y. The elementary transducers No's 8, 16, 24, 32, 40, 48, 56 and 64 can be distinguished in it.

The delay value applied increases linearly from transducer No 8, close to a first side of the square pattern, to transducer No 64, opposite to this first side. This linear change in the applied delays is shown diagrammatically by a straight line 86 in FIG. 10A. Annex A.1.1 shows that the same linear increasing law is applied to the elementary transducers of each alignment in the X direction, i.e. to the elements of each of columns C1 to C8 of the table of annex A.1.1.

FIG. 11A shows the diagram 84 from the front, i.e. projected in a plane with directions Y, Z and a normal direction opposite to the direction X. The elementary transducers No's 1, 2, 3, 4, 5, 6, 7, and 8 as well as the delay values applied to each elementary transducer of the portion 80 can be distinguished in it.

Identical delay values are applied to the elementary transducers disposed in a symmetrical manner with respect to the midpoint perpendicular of the portion 80 which extends in the X direction. In other words, this midpoint perpendicular partitions the portion 80 into two sub-sets of elementary transducers to which two delay sub-laws are applied. A first delay sub-law is applied to the elementary transducers located to the left of this midpoint perpendicular in FIG. 11A, in particular transducers No's 1 to 4, while a second delay sub-law is applied to the elementary transducers located to the right of this midpoint perpendicular, in particular the transducers No's 5 to 8.

The value of the applied delay decreases linearly from transducer No 1, close to a second side of the square pattern, to transducer No 4, close to the midpoint perpendicular of the first side. This linear change in the applied delays is shown diagrammatically by a straight line 88 on FIG. 11A. Annex A.1.1 shows that the same decreasing linear law is applied to the elementary transducers of each alignment in the direction Y located on this same side of the midpoint perpendicular, i.e. in the table of annex A.1.1, to the elements of each of the lines L1 to L8 located at the intersection of columns C1 to C4.

The value of the applied delay increases linearly from transducer No 5, close to the midpoint perpendicular of the first side, to transducer No 8, opposite the second side. This linear change in the applied delays is shown diagrammatically by a straight line 90 in FIG. 11A. The straight lines 88 and 90 are symmetrical with respect to the plane X, Z containing the midpoint perpendicular of the first side of the square pattern. Annex A.1.1 shows that the same increasing linear law is applied to the elementary transducers of each alignment in the Y direction located on this same side of the midpoint perpendicular, i.e. in the table of annex A.1.1, to the elements of each of lines L1 to L8 located at the intersection of columns C5 to C8.

Once sequentially excited in accordance with the delay values discussed above, the elementary transducers of each of the two sub-sets jointly produce a respective beam of ultrasonic waves. The two beams which are produced respectively extend in two respective directions, with the references 92 and 94 in FIG. 11A, each inclined at the same angle, as an absolute value, with respect to the direction of emission of the resultant beam, which direction is denoted 96 in FIG. 11A. Each of these two beams, which may be qualified as primary beams, diverge from the line of sight on moving away from the portion 80.

FIG. 12 is analogous to FIG. 8 and concerns the case of a burst in the longitudinal direction of the tube, i.e. in the Y direction of the tube, i.e. the direction D3 of FIG. 6A. FIG. 12 shows the delay values to be applied to the elementary transducers of the portion 80 in the form of a rod diagram 84.

The portion 80 of the multi-element sensor is in an operating condition with respect to a portion 82 of a tube to be tested, in a manner analogous to that of FIG. 8. Compared with the position of FIG. 8, the portion 80 may have been displaced in the longitudinal direction Y and/or angularly with respect to the central axis of the tube portion 82, for example because of a relative helical movement between the tube and the sensor.

Annex A.1.2 shows the delay values to be applied to the elementary transducers of the portion 80 when they are organized in accordance with the addressing matrix described above with respect to annex A.5.

The same linear increasing law is applied to the elementary transducers of each alignment in the Y direction, i.e. to the elements of each of the lines L1 to L8 of the table of annex A.1.2. The value of the applied delay increases linearly from the transducers close to one side of the square pattern perpendicular to the Y direction to the transducers opposite this side. The delay for the array may depart from a strictly linear change because these values are rounded. Taking into account the resolution of the apparatus conventionally used in this field, of the order of 5 nanoseconds, these roundings in practice have no effect on the detection of defects.

Identical delay values are applied to the elementary transducers disposed symmetrically with respect to the midpoint perpendicular of the portion 80 which extends in the Y direction.

A similar linear decreasing law is applied to the elementary transducers of each alignment in the X direction located on this same side of the midpoint perpendicular, i.e. in the table of annex A.1.2, to the elements of each of columns C1 to C8 located at the intersection of lines L1 to L4. Each time, the applied delay value decreases linearly from the transducer closest to one side of the square pattern perpendicular to the X direction to the transducer closest to the midpoint perpendicular of the second side.

A similar linear increasing law is applied to the elementary transducers of each alignment in the X direction located on this same side of the midpoint perpendicular, i.e. in the table of annex A.1.2, to the elements of each of columns C1 to C8 located at the intersection of lines L5 to L8. Each time, the value of the applied delay increases linearly, from the transducer closest to the midpoint perpendicular of the second side to the transducer opposite the first side.

Once sequentially excited in accordance with the delay values discussed above, the elementary transducers of each of the two sub-sets jointly produce a respective beam of ultrasonic waves. The two beams thus produced respectively extend in two respective directions, each inclined at the same angle, as an absolute value, with respect to the direction of emission of the resultant beam, as in the case of a burst in the longitudinal direction of the tube.

Each of these two primary beams depart from the line of sight on moving away from the portion 80.

Reference will now be made to FIGS. 13A and 14.

FIG. 14 is analogous to FIG. 8 and concerns the case of a burst known as an "oblique" burst, i.e. in a direction inclined at 45° with respect to the axis of the tube in a plane X, Y, i.e. the direction D2 in FIG. 6B. FIG. 14 shows the delay values to be applied to the elementary transducers of the portion 80 in the form of a rod diagram 84. FIG. 13A shows the diagram 84 at a different viewing angle.

The portion 80 of the multi-element sensor is in a working position with respect to a portion 82 of a tube to be tested, in analogous manner to that of FIG. 8. Compared with the position of FIG. 8, the portion 80 may have been displaced in the longitudinal direction Y and/or angularly with respect to the central axis of the tube portion 82, for example because of a relative helical movement between the tube and the sensor.

Annex A.1.3 shows the delay values to be applied to the elementary transducers of the portion 80 when they are organized in accordance with the addressing matrix described above in respect of annex A.5.

Respective linear increasing laws are applied to the elementary transducers of each alignment in the Y direction, i.e. to the elements of each of lines L1 to L8 of the table of annex A.1.3. Each time, the value of the applied delay increases linearly from the transducers close to the second side of the square pattern to the transducers opposite this second side.

Respective linear increasing laws are applied to the elementary transducers of each alignment in the X direction, i.e. to the elements of each of columns C1 to C8 of the table of annex A.1.2. Each time, the value of the applied delay increases linearly, from the transducers close to the first side of the square pattern to the transducers opposite this first side.

Once sequentially excited in accordance with the delay values discussed above, the elementary transducers of each of two sub-sets, separated from each other by the diagonal of the square pattern, jointly produce a respective ultrasonic wave beam. The two beams produced thereby respectively extend along two respective directions, each inclined at the same angle, as an absolute value, with respect to the direction of emission of the resultant beam. Each of these two primary beams diverge from the line of sight on moving away from the portion 80.

More generally, we now focus on the construction of a temporal excitation law to allow an oblique burst, for example in the second direction D2, in the case of the first variation.

The burst direction D2 corresponds to an axis of symmetry of array 5', namely one of the diagonals of the square pattern. This diagonal defines two sub-sets of elementary transducers, a lower sub-set and an upper sub-set.

Because of the curvature of the tube to be tested, the delay values to be applied to the first of these sub-sets differs from the delay values to be applied to the symmetrical transducers of the second of these sub-sets.

Reference will again be made to FIG. 7A.

Firstly, the first delay values Bi,j to be applied to the set of elementary transducers Ci,j of array 5' are computed such that these together emit a non-focused beam of ultrasonic waves deflected in a direction D2−β. These values are shown in a generic manner in the table 70.

Reference will now be made to FIG. 15.

Next, second delay values Ai,j to be applied to the set of elementary transducers Ci,j of array 5' are computed such that they jointly emit a non-focused beam of ultrasonic waves deflected in a direction D2+β. These values are shown in a generic manner in the table 73.

Reference will now be made to FIG. 16.

Next, one of the emission directions D2+β and D2−β is selected for the diagonal of the pattern of array 5', i.e. to finally be attributed to the transducers Ci,i of the diagonal, whether these are the first delay values Bi,i or the second delay values Ai,i. By convention, the values which maximize the delay to the transducers are selected to be those at each of the ends of this diagonal. By way of example, assume that in the case of the table 72 of FIG. 16, this criterion is verified by the values A8,1 and A1,8 of table 73, and not the values B8,1 and B1,8 of table 70, because the energy requirement in the direction corresponding to elements A is higher, linked to a weaker response in this direction, which weakness derives from the geometry of the tube.

The delay values of the law corresponding to the other corners are stored, namely, in the example, the second value A1,1 and the first value B8,8.

The second delay values Ai,j are attributed to the elements Ci,j of the upper portion of the array 5' as final delay values. The final delay values for the elements Ci,j of the lower portion of array 5' are deduced by linear interpolation starting from the first delay values Bi,j. Initially, the delay value for the corner corresponding to the portion of the array for which the values are to be determined is used in order to compute the delay values for the column and the corresponding line by linear interpolation. Thus, in each case an interpolation is carried out between a value determined for the diagonal and a value at the end of the line or column.

In other words, the values for half of the array corresponding to the diagonal are retained, while the other delay values are slightly modified by linear interpolation starting from the initially obtained values.

Reference will now be made to FIGS. 9B, 10B, 11B and 13B which illustrate the delay values to be applied to elementary transducers in the second variation of the invention.

In accordance with this second variation, the elementary transducers jointly produce a defocussed primary beam which is deflected with respect to the normal to the principal plane of the sensor. In order to compute the delay laws, a divergent beam may be considered to be a beam with an inverted focus, i.e. which has a virtual focal point located behind the multi-element sensor in the burst direction of the ultrasonic waves. In order to obtain a resultant defocussed beam, delay values which follow a parabolic law are preferably applied to at least some of the elementary transducers of the sensor. In a variation, these delay values are obtained from a law which is close to a parabolic law, for example corresponding to a plurality of linear laws each approaching a portion of the same parabola.

In addition to the obliquity of its primary direction, a divergent and deflected beam may be defined by the angle of deflection α and a value for the angle of opening of the beam or divergence angle δ.

The angle of deflection α is determined as a function of the diameter of the tube to be tested and of the distance separating the sensor from this tube. It is different for each of the bursts in the directions D1, D2 and D3. For bursts in the other directions, the values for the angle of deflection α are deduced from the symmetries of the pattern of the sensor.

The value for the angle of divergence δ may be the same for the set of bursts, irrespective of the line of sight. The largest angle of divergence which is compatible with the criteria of quality and/or rapidity which are fixed, is sought. As an example, the value for the angle of divergence may derive from the fact that the number of bursts is fixed because of a production requirement. This gives rise to a minimum value for the angle of divergence δ. The value for the angle of divergence may also derive from a quality criterion, linked to the size of the defects which one wishes to be able to detect. This imposes a maximum value on the angle of divergence δ. In the majority of applications, the value for the angle of divergence δ will be selected so that is best satisfies these criteria.

These parameters may be determined by successive tests, or by simulation, on calibration notches the respective orientation and depth of which correspond to defects which are to be investigated in the tube.

As an example, a value of 22.5° for the angle of divergence δ may be used.

FIGS. 9B, 10B and 11B are analogous to FIGS. 9A, 10A and 11A. They show, in the form of a rod diagram 84, an example of the delay values to be applied to the elementary transducers of the portion 80 of the sensor in order to produce a burst in a transverse direction X of the tube portion 82. The transducers are addressed in accordance with annex A.5. The delay values are shown in the table of annex A.2.1.

FIG. 10B shows the diagram 84 viewed from the right, i.e. projected in a plane of directions X, Z and the normal direction Y. The elementary transducers No's 8, 16, 24, 32, 40, 48, 56 and 64 may be distinguished.

The applied delay value increases in a parabolic manner from transducer No 8 close to a first side of the square pattern, to transducer No 64 opposite this first side. This parabolic change in the applied delays is shown for a portion of the parabola 142 in FIG. 10B. Annex A.2.1 shows that the same increasing law is applied to the elementary transducers of each alignment in the X direction, i.e. to the elements of each of columns C1 to C8 of the table of annex A.2.1.

FIG. 11B shows the diagram 84 in front view, i.e. projected in a plane of directions Y, Z and with a normal direction opposite to the X direction. The elementary transducers No's 1, 2, 3, 4, 5, 6, 7 and 8 can be distinguished, along with the delay value applied to the elementary transducers of the portion 80.

Identical delay values are applied to the elementary transducers disposed in a symmetrical manner with respect to the midpoint perpendicular of the portion 80 which extends in the X direction. This midpoint perpendicular partitions the portion 80 into two sub-sets of elementary transducers to which two delay sub-laws are respectively applied. A first delay sub-law is applied to the elementary transducers located on one side of this midpoint perpendicular, in particular to transducers No's 1 to 4 located on the left of this midpoint perpendicular in FIG. 11B. A second delay sub-law is applied to the elementary transducers located on the other side of this midpoint perpendicular, in particular to transducers numbers 5 to 8 located on the right of this midpoint perpendicular in FIG. 11B.

The applied delay value follows a parabolic law from transducer No 1, close to one side of the square pattern, to transducer No 8, distanced from this side. This change in the applied delays is shown diagrammatically for a portion of the parabola 144 in FIG. 11B.

The delay value decreases from transducer No 1 to transducer No 4. Annex A.2.1 shows that the same parabolic decreasing law is applied to the elementary transducers of each alignment in the Y direction located on the same side of the midpoint perpendicular, i.e. in the table of Annex A.2.1, to the elements of each of lines L1 to L8 situated at the intersection of columns C1 to C4.

The applied delay value increases from transducer No 5, close to the midpoint perpendicular, to transducer No 8. Annex A.2.1 shows that the same parabolic increasing law is applied to the elementary transducers of each alignment in the Y direction situated on this same side of the midpoint perpendicular, i.e. in the table of Annex A.2.1, to the elements of each of lines L1 to L8 situated at the intersection of columns C5 to C8.

Once sequentially excited in accordance with the delay values discussed above, the elementary transducers of each of the two sub-sets jointly produce a beam of ultrasonic waves which extends in the X direction and which diverges with increasing distance from the portion 80 of the sensor.

The table of annex A.2.2 shows the delay values which may be applied to the elementary transducers in order to jointly produce a divergent beam of ultrasonic waves which extends in the Y direction.

Identical delay values are applied to the elementary transducers disposed symmetrically with respect to the midpoint perpendicular of the portion 80 which is disposed in the X direction. This midpoint perpendicular partitions the portion 80 into two sub-sets of elementary transducers, to which two delay sub-laws are respectively applied.

Figure 13B:
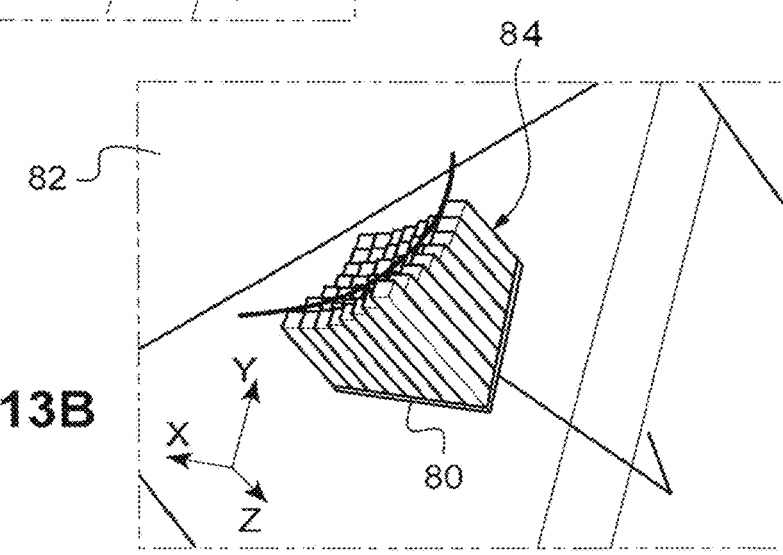

FIG. 13B is analogous to FIG. 13A and concerns the case of a burst termed "oblique", i.e. in a direction inclined at 45° with respect to the axis of the tube in a plane X,Y, i.e. the direction D2 of FIG. 6B. FIG. 13B shows the delay values to be applied to the elementary transducers of the portion 80 in the form of a rod diagram 84.

The portion 80 of the multi-element sensor is in a working position with respect to a portion 82 of a tube to be tested, in analogous manner to that of FIG. 8. Compared with the position of FIG. 8, the portion 80 may have been displaced in the longitudinal direction Y and/or angularly with respect to the central axis of the tube portion 82, for example because of a relative helical movement between the tube and the sensor.

Annex A.2.3 shows the delay values to be applied to the elementary transducers of the portion 80 when they are organized in accordance with the addressing matrix described above in relation to annex A.5.

Respective parabolic increasing laws are applied to the elementary transducers of each alignment in the Y direction, i.e. to the elements of each of lines L1 to L8 in the table of annex A.2.3. Each time, the value of the applied delay increases in a parabolic manner, from the transducers close to one side of the square pattern to the transducers opposite this side with respect to the X direction.

Respective parabolic increasing laws are applied to the elementary transducers of each alignment in the X direction, i.e. to the elements of each of columns C1 to C8 of the table of annex A.2.3. Each time, the value of the applied delay increases in a parabolic manner from the transducers close to one side of the square pattern to the transducers opposite this side with respect to the Y direction.

Once sequentially excited in accordance with the delay values discussed above, the elementary transducers of each of two sub-sets, separated from each other by the diagonal of the square pattern, jointly produce an ultrasonic wave beam extending in the direction D2 and diverging with respect to this direction with motion away from the sensor.

In an analogous manner to that described above with respect to the first variation, it is possible to use the various symmetries of the sensor pattern to deduce certain delay laws from laws computed for other burst directions.

We shall now turn to the second embodiment of the invention, in which the elementary transducers jointly produce a divergent non-deflected resultant beam which extends in the direction normal to the principal plane of the sensor. In this second embodiment, a single burst of ultrasonic waves is carried out. The divergent beam may be defined by a beam opening angle or angle of divergence δ.

In this embodiment, the first axis of symmetry x and the second axis of symmetry y of the pattern of array 5' define four sub-sets of elementary transducers to which the same delay sub-law is applied each time. The table of annex A.4 indicates an example of delay values to be applied to the elementary transducers in order to generate a resultant beam which is divergent and non-deflected with respect to the direction normal to the active surface of the sensor. In this case, this divergent beam results from a defocussed primary beam.

Each time, the delay value increases with distance from each of the first axis of symmetry x and the second axis of symmetry y.

Two variations of a first embodiment of the invention have just been described which can be used to carry out sequential bursts in distinct directions. In each of these bursts, a broad portion of the tube to be inspected is "insonified", producing a resultant divergent beam. A large portion of the tube is covered by the ultrasonic waves resulting from the burst. The deflection of the resultant beam can be used to detect the presence of defects with a corresponding orientation with respect to the tube. In a first variation, the divergent and deflected beam results from at least two non-focused and deflected primary beams respectively generated by a sub-set of elementary transducers. In a second variation, the divergent and deflected beam results from at least one divergent and deflected primary beam.

A second embodiment which can be used to produce a single burst in order to detect the presence of defects irrespective of their inclination has also just been described. Here again, the divergent nature of the beam means that a broad portion of the tube to be tested can be insonified.

Each time, the symmetry of the sensor is used to compute delay sub-laws which are applied to a sub-set of elementary transducers.

The ultrasonic waves received in response to a burst are processed in order to detect in them any echoes resulting from the presence of defects or imperfections.

In a first development of the invention, processing the received ultrasonic waves comprises applying a delay law termed the "inverse" of the delay law which served to emit the ultrasonic waves during a burst. In other words, processing of the received ultrasonic waves comprises applying a specific delay value $R_{i,j}$ to the signal received at each elementary transducer $C_{i,j}$ of the sensor. The delay value on reception Ri,j is computed from the delay value Ei,j applied to the elementary transducer Ci,j on emission, using the following formula:

$$Ri,j = \max(Ei,j) - Ei,j$$

The value max (Ei,j) represents the maximum delay value of the delay values applied to the elementary transducers Ei,j of the sensor.

Computation of an inverse delay law may be carried out using software which has allowed the computation of the emission delay law using a spreadsheet, or manually. Thus, in the inspected tube section, defects or imperfections orientated in a manner corresponding to the direction of the burst are principally detected. It is also possible to detect therein defects which are slightly inclined with respect to this direction, limited by the aperture of the primary beam, generally having a smaller signal to noise ratio.

Advantageously in a second development, processing of the received ultrasonic waves comprises application of the technique known from the document WO 03/050527. For each burst, the received signals are processed by applying several inverse delay laws, each corresponding to an obliquity value included in the primary beam. These inverse delay laws are conventionally computed using the technique known from WO 03/050527. As an example, the various obliquity values are distinguished from each other by a value of 5°. Following one burst, in the inspected section of tube, defects orientated in different obliquities included in the primary beam resulting from this burst are detected with, in each case, a signal to noise ratio which is practically identical. In this second development, the defects for which the orientation is both included in the aperture of the ultrasonic wave beam corresponding to the burst and inclined with respect to the obliquity of the principal direction of this beam, are detected with a better signal to noise ratio. In other words, this second development improves detection of fine defects. In other words, the device has better resolution in this case.

As an example, with an emitting beam with an angle of opening of 40°, and application of delay laws corresponding to respective inclinations of 5°, defects inclined at 0, ±5°, ±10°, ±15°, ±20° with respect to the principal direction of the beam are particularly effectively detected.

Reference will now be made to FIGS. 17, 18A and 18B.

These Figures represent zones known as "insonification" zones, i.e. struck by at least a portion of one of the ultrasonic beams used to inspect all of the possible orientations of defects. These figures result from simulations.

FIG. 17 corresponds to a reference configuration. In this configuration, 72 bursts have been carried out, each time in a direction with an obliquity of 5° with respect to the preceding burst. FIG. 17 shows an insonification zone at −6 decibels, or focal zone, where the maximum energy is concentrated. The zone is in the form of an elliptical ring and is practically homogeneous. The insonification zone measures approximately 50 millimetres by 30 millimetres.

FIG. 18A corresponds to the configuration in accordance with the first variation of the first embodiment in the case in which the "paintbrush" technique is applied, during post-processing. The parameter β is 15°. Only 8 bursts have been necessary to obtain the result of FIG. 18A. The amplitudes are practically homogeneous for all lines of sight. FIG. 18A shows an insonification zone which appears almost as an elliptical ring. The insonification zone measures approximately 50 millimetres by 35 millimetres, which is very close to the reference zone for FIG. 17.

FIG. 18B corresponds to the configuration in accordance with the second embodiment in the case in which the so-called "paintbrush" technique is applied during post-processing. The beam is defocussed at 25 millimetres. FIG. 18B shows an insonification zone which is elliptical in appearance. The decibel zone measures 80 millimetres by 60 millimetres, which is close to the reference zone of FIG. 17. The zone at −6 decibels is broader than for the first embodiment. The central portion of the ellipse is also insonified, although this zone is of less use for inspection of the tube.

Compared with FIG. 18A, FIG. 18B shows a more homogeneous insonification zone corresponding to a practically identical level of energy for all of the inspected directions.

Compared with FIG. 18B, FIG. 18A shows a central zone of the ellipse which is not insonified, which means that the signal to noise ratio is better. However, the second embodiment offers a faster inspection rate.

An insonification diagram corresponding to the second variation of the first embodiment has not been shown. Such a diagram has a broader elliptical insonification zone than those shown in FIGS. 17, 18A and 18B. It results in a poorer signal to noise ratio and relative energy loss. However, that diagram has greater homogeneity in the lines of sight, which facilitates inspection. In particular, it is not necessary to compensate for the energy differences between the various lines of sight.

The Applicant has succeeded in testing a tube in a satisfactory manner as to the existence of defects orientated in any manner in just eight bursts, while retaining the usual advance speeds used in the art.

A device which can be used to test a tube as regards the existence of defects at any inclination at a speed compatible with production rates has just been described. This increase in speed results primarily from the fact that repositioning of the sensor with respect to the tube between two successive bursts in different directions is of no effect. In the device in question, for each line of sight, beams of ultrasonic waves are generated by respective portions of a square multi-element sensor which diverge with respect to the line of sight and which join up as they strike the outer surface of the tube to be tested.

This device is not limited to a sensor with a square pattern. It may be used in an equivalent manner with a sensor in which the elementary transducers are organized into the shape of a rectangle. A sensor may also be used in which the elementary transducers are distributed in a circle. In this case, the portions of the pattern dedicated to each divergent beam correspond to an angular sector of the pattern. As an example, successive bursts may be produced on the various sectors, with delay laws which can be computed using software analogous to that known as "CIVA".

The invention may also be viewed as a process for testing a long metallurgical product, in particular a tube, in which the device described is used repeatedly to fire it in each of the directions D1 to D8.

The invention may also be viewed as a method for testing metallurgical products in which a burst of ultrasonic waves is produced in a line of sight with the aid of an ultrasonic sensor comprising a plurality of elementary transducers operable independently of each other and distributed in accordance with a two-dimensional pattern by applying a temporal excitation law to the elementary transducers, this temporal excitation law comprising one or more sub-laws to sequentially excite each of at least one sub-set of the plurality of elementary transducers, each sub-law being arranged such that excitation of the elementary transducers of the corresponding sub-set produces a respective primary beam of ultrasonic waves, and the sub-law or laws also being arranged such that said burst corresponds to a beam of ultrasonic waves resulting from the respective beams of primary ultrasonic waves of the sub-sets of elementary transducers, said resultant beam diverging about the line of sight on moving away from the ultrasonic sensor.

A value for the angle β of 20° has been described by way of example, in particular in the context of a burst in direction D1. The value of this angle may be adapted as a function of the size of the elementary transducers. As an example, the value of this angle may be increased if the size of the transducers is decreased.

In accordance with one aspect of the invention, sub-laws are applied in a manner so as to simultaneously excite the elementary transducers disposed mutually symmetrically with respect to a preferential direction of said pattern. Although the axes of symmetry of a square pattern have been described as preferential directions, the invention is not in any way limited to this particular embodiment. Patterns with different shapes each have corresponding preferential directions for these patterns. As an example, a pattern in which the transducer elements are configured into angular sectors and are symmetrically disposed with respect to certain radial directions, for example inclined at 120° with respect to each other, have these radial directions as preferential directions.

More particularly, an ultrasonic sensor with a matrix shape comprising 64 elements distributed in accordance with a square 8-element by 8-element pattern has been described. The invention is not limited either to this number of elements or to this particular pattern. Each time, an ultrasonic burst can be used to inspect a longitudinal section of a tube as to the existence of defects. In order to test the entire length of this tube, the tube and the ultrasonic sensor may be displaced with respect to each other. In a development of the invention, it is possible to use ultrasonic sensors disposed one beside the other in the longitudinal direction of the tube to be tested. By operating the sensors simultaneously with respect to each other, for each relative position of the sensor and tube, it is possible to inspect a longer section of this tube. In yet another development, it is possible to use a multi-element array ultrasonic sensor wherein the pattern has been broken down into elementary sub-patterns and each sub-pattern is operated simultaneously with the others in the manner of an isolated ultrasonic sensor. This means that a longer portion of the tube to be tested is inspected. As an example, an ultrasonic sensor of this type could comprise 256 elements distributed in a rectangular 8 element by 32 element pattern. By positioning this sensor such that the long side of the pattern corresponds to the length of the tube, then virtually, 8 multi-element square sensors each being an 8 element by 8 element square are disposed along the length of the tube. And these 8 sensors could be operated simultaneously to inspect a large length of the tube for each burst.

The invention is not limited to the embodiments described above by way of example only, but encompasses any variation which the skilled person could envisage.

Annex A.1: Delay values corresponding to first embodiment, first variation (in nanoseconds)

Annex A.1.1: burst in direction D1

|    | C1  | C2  | C3  | C4  | C5  | C6  | C7  | C8  |
|----|-----|-----|-----|-----|-----|-----|-----|-----|
| L1 | 127 | 85  | 43  | 0   | 0   | 43  | 85  | 127 |
| L2 | 250 | 208 | 166 | 123 | 123 | 166 | 208 | 250 |
| L3 | 373 | 331 | 289 | 246 | 246 | 289 | 331 | 373 |
| L4 | 495 | 453 | 411 | 369 | 369 | 411 | 453 | 495 |
| L5 | 617 | 575 | 533 | 490 | 490 | 533 | 575 | 617 |
| L6 | 738 | 697 | 654 | 612 | 612 | 654 | 697 | 738 |
| L7 | 859 | 817 | 775 | 732 | 732 | 775 | 817 | 859 |
| L8 | 979 | 938 | 895 | 853 | 853 | 895 | 938 | 979 |

Annex A.1.2: burst in direction D3

|    | C1  | C2  | C3  | C4  | C5  | C6  | C7  | C8   |
|----|-----|-----|-----|-----|-----|-----|------|------|
| L1 | 114 | 290 | 464 | 639 | 813 | 986 | 1159 | 1332 |
| L2 | 77  | 252 | 427 | 601 | 775 | 949 | 1122 | 1294 |
| L3 | 39  | 214 | 389 | 563 | 737 | 911 | 1084 | 1256 |
| L4 | 0   | 175 | 350 | 525 | 699 | 872 | 1045 | 1217 |
| L5 | 0   | 175 | 350 | 525 | 699 | 872 | 1045 | 1217 |
| L6 | 39  | 214 | 389 | 563 | 737 | 911 | 1084 | 1256 |
| L7 | 77  | 252 | 427 | 601 | 775 | 949 | 1122 | 1294 |
| L8 | 114 | 290 | 464 | 639 | 813 | 986 | 1159 | 1332 |

Annex A.1.3: burst in direction D2

|    | C1  | C2  | C3   | C4   | C5   | C6   | C7   | C8   |
|----|-----|-----|------|------|------|------|------|------|
| L1 | 0   | 157 | 314  | 471  | 627  | 782  | 937  | 1091 |
| L2 | 116 | 230 | 387  | 544  | 700  | 855  | 1010 | 1164 |
| L3 | 233 | 346 | 460  | 616  | 772  | 928  | 1083 | 1237 |
| L4 | 349 | 462 | 575  | 688  | 844  | 1000 | 1155 | 1309 |
| L5 | 466 | 578 | 691  | 803  | 916  | 1071 | 1226 | 1381 |
| L6 | 582 | 694 | 806  | 918  | 1030 | 1142 | 1297 | 1451 |
| L7 | 699 | 810 | 922  | 1033 | 1145 | 1256 | 1367 | 1522 |
| L8 | 815 | 926 | 1037 | 1148 | 1259 | 1370 | 1481 | 1592 |

Annex A.1.4: burst in direction D4

|    | C1  | C2  | C3   | C4   | C5   | C6   | C7   | C8   |
|----|-----|-----|------|------|------|------|------|------|
| L1 | 815 | 926 | 1037 | 1148 | 1259 | 1370 | 1481 | 1592 |
| L2 | 699 | 810 | 922  | 1033 | 1145 | 1256 | 1367 | 1522 |
| L3 | 582 | 694 | 806  | 918  | 1030 | 1142 | 1297 | 1451 |
| L4 | 466 | 578 | 691  | 803  | 916  | 1071 | 1226 | 1381 |
| L5 | 349 | 462 | 575  | 688  | 844  | 1000 | 1155 | 1309 |
| L6 | 233 | 346 | 460  | 616  | 772  | 928  | 1083 | 1237 |
| L7 | 116 | 230 | 387  | 544  | 700  | 855  | 1010 | 1164 |
| L8 | 0   | 157 | 314  | 471  | 627  | 782  | 937  | 1091 |

Annex A.2: Delay values corresponding to first embodiment, second variation (in nanoseconds)

Annex A.2.1: burst in direction D1

|    | C1   | C2   | C3   | C4   | C5   | C6   | C7   | C8   |
|----|------|------|------|------|------|------|------|------|
| L1 | 135  | 67   | 23   | 0    | 0    | 23   | 67   | 135  |
| L2 | 251  | 185  | 140  | 118  | 118  | 140  | 185  | 251  |
| L3 | 389  | 323  | 279  | 257  | 257  | 279  | 323  | 389  |
| L4 | 548  | 482  | 438  | 416  | 416  | 438  | 482  | 548  |
| L5 | 726  | 661  | 618  | 596  | 596  | 618  | 661  | 726  |
| L6 | 924  | 860  | 817  | 796  | 796  | 817  | 860  | 924  |
| L7 | 1141 | 1078 | 1036 | 1014 | 1014 | 1036 | 1078 | 1141 |
| L8 | 1376 | 1314 | 1272 | 1251 | 1251 | 1272 | 1314 | 1376 |

Annex A.2.2: burst in direction D3

|    | C1  | C2  | C3  | C4  | C5  | C6  | C7  | C8   |
|----|-----|-----|-----|-----|-----|-----|-----|------|
| L1 | 133 | 194 | 277 | 381 | 506 | 652 | 817 | 1002 |
| L2 | 67  | 128 | 211 | 316 | 441 | 587 | 754 | 939  |
| L3 | 22  | 84  | 167 | 272 | 398 | 544 | 711 | 897  |
| L4 | 0   | 62  | 145 | 250 | 376 | 523 | 690 | 876  |
| L5 | 0   | 62  | 145 | 250 | 376 | 523 | 690 | 876  |
| L6 | 22  | 84  | 167 | 272 | 398 | 544 | 711 | 897  |
| L7 | 67  | 128 | 211 | 315 | 441 | 587 | 754 | 939  |
| L8 | 133 | 194 | 277 | 381 | 506 | 652 | 817 | 1002 |

Annex A.2.3: burst in direction D2

|    | C1  | C2  | C3  | C4  | C5   | C6   | C7   | C8   |
|----|-----|-----|-----|-----|------|------|------|------|
| L1 | 0   | 30  | 83  | 158 | 255  | 373  | 512  | 672  |
| L2 | 56  | 86  | 139 | 213 | 310  | 428  | 567  | 726  |
| L3 | 134 | 164 | 216 | 291 | 387  | 504  | 642  | 801  |
| L4 | 234 | 264 | 316 | 390 | 485  | 602  | 739  | 897  |
| L5 | 355 | 385 | 436 | 510 | 604  | 720  | 857  | 1013 |
| L6 | 497 | 527 | 578 | 651 | 745  | 860  | 995  | 1150 |
| L7 | 660 | 689 | 740 | 812 | 905  | 1019 | 1153 | 1307 |
| L8 | 842 | 871 | 922 | 993 | 1085 | 1198 | 1330 | 1483 |

Annex A.3: Transposition laws for delay values

| Direction of burst | Delay values           | Transformation          |
|--------------------|------------------------|-------------------------|
| D1                 | Computed               | None                    |
| D2                 | Computed               | None                    |
| D3                 | Computed               | None                    |
| D4                 | Deduced from values for D2 | $B_{i,j} := B_{i, n+1-j}$ |
| D5                 | Deduced from values for D1 | $B_{i,j} := B_{n+1-i, j}$ |
| D6                 | Deduced from values for D4 | $B_{i,j} := B_{n+1-i, j}$ |
| D7                 | Deduced from values for D3 | $B_{i,j} := B_{n+1-i, j}$ |
| D8                 | Deduced from values for D6 | $B_{i,j} := B_{i, n+1-j}$ |

Annex A.4: Delay values corresponding to second embodiment (in nanoseconds)

|    | C1  | C2  | C3  | C4  | C5  | C6  | C7  | C8  |
|----|-----|-----|-----|-----|-----|-----|-----|-----|
| L1 | 582 | 456 | 365 | 310 | 310 | 365 | 456 | 582 |
| L2 | 456 | 330 | 239 | 184 | 184 | 239 | 330 | 456 |
| L3 | 365 | 239 | 148 | 93  | 93  | 148 | 239 | 365 |
| L4 | 310 | 184 | 93  | 38  | 38  | 93  | 184 | 310 |
| L5 | 310 | 184 | 93  | 38  | 38  | 93  | 184 | 310 |
| L6 | 365 | 239 | 148 | 93  | 93  | 148 | 239 | 365 |
| L7 | 456 | 330 | 239 | 184 | 184 | 239 | 330 | 456 |
| L8 | 582 | 456 | 365 | 310 | 310 | 365 | 456 | 582 |

Annex A.5: Addressing matrix for elementary transducers of a sensor

|    | C1    | C2    | C3    | C4    | C5    | C6    | C7    | C8    |
|----|-------|-------|-------|-------|-------|-------|-------|-------|
| L1 | No 1  | No 2  | No 3  | No 4  | No 5  | No 6  | No 7  | No 8  |
| L2 | No 9  | No 10 | No 11 | No 12 | No 13 | No 14 | No 15 | No 16 |
| L3 | No 17 | No 18 | No 19 | No 20 | No 21 | No 22 | No 23 | No 24 |
| L4 | No 25 | No 26 | No 27 | No 28 | No 29 | No 30 | No 31 | No 32 |
| L5 | No 33 | No 34 | No 35 | No 36 | No 37 | No 38 | No 39 | No 40 |
| L6 | No 41 | No 42 | No 43 | No 44 | No 45 | No 46 | No 47 | No 48 |
| L7 | No 49 | No 50 | No 51 | No 52 | No 53 | No 54 | No 55 | No 56 |
| L8 | No 57 | No 58 | No 59 | No 60 | No 61 | No 62 | No 63 | No 64 |

The invention claimed is:

1. A device for testing metallurgical products, comprising:
an ultrasonic sensor comprising a plurality of elementary transducers which are operable independently of each other and which are distributed in accordance with a two-dimensional pattern;
a first electronic component configured to excite each of the elementary transducers in accordance with at least one temporal law corresponding to a burst of ultrasonic waves in a line of sight from the plurality of elementary transducers; and
a second electronic component configured to process at least a portion of signals captured by each of the elementary transducers,
wherein each temporal law is arranged such that a corresponding burst of the ultrasonic waves from the plurality of elementary transducers jointly produces a beam of ultrasonic waves which is divergent about the line of sight with increasing distance from the ultrasonic sensor, the first electronic component is configured to control the divergence about the line of sight by the at least one temporal law, and the at least one temporal law produces a defocused primary beam jointly from the plurality of elementary transducers.

2. The device according to claim 1, wherein each temporal law comprises at least one temporal sub-law for excitation of at least one respective sub-set of the elementary transducers.

3. The device according to claim 2, wherein each sub-set of elementary transducers corresponds to a respective portion of the pattern.

4. The device according to claim 3, wherein the portions of the pattern correspond as a whole to a partition of the pattern.

5. The device according to claim 4, wherein the partition of the pattern corresponds to axes of symmetry of the pattern which correspond to the line of sight.

6. The device according to claim 2, wherein each sub-law is arranged such that excitation of the elementary transducers of the corresponding sub-set produces a respective primary beam of ultrasonic waves, and the divergent beam of ultrasonic waves results from respective primary beams of ultrasonic waves from sub-sets of elementary transducers.

7. The device according to claim 1, wherein the plurality of elementary transducers is divided into a plurality of two-dimensional sub-patterns of the elementary transducers, each temporal law comprises a temporal sub-law for excitation of the corresponding sub-pattern of the elementary transducers to simultaneously produce a primary from each of the sub-pattern of the elementary transducers, and the divergent beam of ultrasonic waves results from the primary beams of ultrasonic waves produced from each sub-pattern of the elementary transducers.

8. The device according to claim 7, wherein each of the primary beams produced from the sub-patterns of the elementary transducers extends in a respective direction which diverges from the line of sight on moving away from the ultrasonic sensor.

9. The device according to claim 7, wherein each primary beam is substantially free of focusing.

10. The device according to claim 7, wherein each primary beam is defocussed in the line of sight.

11. The device according to claim 7, wherein each temporal law is arranged such that excitation of the corresponding elementary transducers produces a single defocussed primary beam of ultrasonic waves in the line of sight.

12. The device according to claim 7, wherein the primary beams meet a target surface corresponding to the line of sight at respective penetration zones of the surface which are mutually adjacent.

13. The device according to claim 7, wherein the primary beams extend in respective directions which are inclined at substantially a same angle on either side of the line of sight.

14. The device according to claim 1, wherein each line of sight corresponds to a respective preferential direction of the pattern.

15. The device according to claim 14, wherein each preferential direction corresponds to an axis of symmetry of the pattern.

16. The device according to claim 1, wherein the pattern corresponds to a square or rectangular shaped array.

17. The device according to claim 1, wherein the plurality of elementary transducers are distributed over an active surface of the ultrasonic sensor and each line of sight is inclined with respect to a direction normal to the active surface at a central position of the pattern.

18. The device according to claim 1, wherein the plurality of elementary transducers are distributed over an active surface of the ultrasonic sensor and the line of sight is normal to the active surface, at least at a central position of the pattern.

19. The device according to claim 1, wherein at least some of the temporal laws comprise identical sub-laws for simultaneous excitation of the elementary transducers disposed mutually symmetrically with respect to a preferential direction of the pattern.

20. The device according to claim 1, wherein lines of sight of a plurality of bursts of ultrasonic waves are inclined with respect to each other in a substantially identical manner.

21. The device according to claim 1, wherein the at least one temporal law includes delay values which follow a parabolic law.

22. The device according to claim 1, wherein the at least one temporal law includes delay values of a plurality of linear laws each approaching a portion of a same parabola.

23. A method for testing metallurgical products, comprising:

providing an ultrasonic sensor including a plurality of elementary transducers which are operable independently of each other and which are distributed in accordance with a two-dimensional pattern;

exciting, with a first electronic component, each of the elementary transducers to produce a burst of ultrasonic waves that jointly correspond to a beam which is divergent about a line of sight from the plurality of elementary transducers on moving away from the ultrasonic sensor;

controlling, with the first electronic component, the divergence of the beam about the line of sight by at least one temporal law corresponding to the burst of ultrasonic waves in the line of sight, and the at least one temporal law produces a defocused primary beam jointly from the plurality of elementary transducers; and processing at least a portion of signals captured by each of the elementary transducers in response to the ultrasonic burst.

24. The device according to claim 23, wherein the providing includes dividing the plurality of elementary transducers into a plurality of two-dimensional sub-patterns of the elementary transducers, wherein the exciting includes exciting each of the sub-patterns of the elementary transducers simultaneously, each temporal law comprises a temporal sub-law for excitation of the corresponding sub-pattern of the elementary transducers to simultaneously produce a primary beam from each of the sub-pattern of the elementary transducers, each of the primary beams produced from the sub-patterns of the elementary transducers extends in a respective direction which diverges from the line of sight on moving away from the ultrasonic sensor, and the divergent beam of ultrasonic waves results from the primary beams of ultrasonic waves produced from each sub-pattern of the elementary transducers.

* * * * *

UNITED STATES PATENT AND TRADEMARK OFFICE
CERTIFICATE OF CORRECTION

PATENT NO. : 10,641,737 B2  
APPLICATION NO. : 14/651942  
DATED : May 5, 2020  
INVENTOR(S) : Raphael Michel et al.

Page 1 of 1

It is certified that error appears in the above-identified patent and that said Letters Patent is hereby corrected as shown below:

On the Title Page

In Column 1, item (72), Inventors, Line 2, delete "Commegnies" and insert -- Gommegnies --.

In Column 1, item (86), PCT No., delete "PCT/FR2013/531610" and insert -- PCT/FR2013/053161 --.

In the Specification

In Column 2, Line 30, delete "piezeoelectric" and insert -- piezoelectric --.

In Column 7, Line 44, below "tube." insert -- In accordance with the first embodiment of the invention, at least one burst is carried out in a particular direction of obliquity, which corresponds to the orientation of the investigated defects. --, in Column 7, Line 45, as a new paragraph.

In Column 8, Line 8 (approx.), table 1, delete "276°" and insert -- 270° --.

In Column 8, Line 13, delete "i" and insert -- π --.

In the Claims

In Column 24, Line 61, Claim 7, delete "produce a primary from each" and insert -- produce a primary beam from each --.

In Column 26, Line 27, Claim 24, delete "device" and insert -- method --.

Signed and Sealed this  
Eighth Day of December, 2020

Andrei Iancu  
*Director of the United States Patent and Trademark Office*